US010769140B2

(12) United States Patent
Bernstein et al.

(10) Patent No.: US 10,769,140 B2
(45) Date of Patent: Sep. 8, 2020

(54) CONCEPT EXPANSION USING TABLES

(71) Applicant: Microsoft Technology Licensing, LLC, Redmond, WA (US)

(72) Inventors: Philip A. Bernstein, Bellevue, WA (US); Kaushik Chakrabarti, Redmond, WA (US); Zhimin Chen, Redmond, WA (US); Yeye He, Redmond, WA (US); Chi Wang, Bellevue, WA (US); Kris K. Ganjam, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 522 days.

(21) Appl. No.: 14/754,318

(22) Filed: Jun. 29, 2015

(65) Prior Publication Data
US 2016/0378765 A1 Dec. 29, 2016

(51) Int. Cl.
*G06F 16/245* (2019.01)
*G06F 16/901* (2019.01)

(52) U.S. Cl.
CPC ........ *G06F 16/245* (2019.01); *G06F 16/9024* (2019.01)

(58) Field of Classification Search
CPC ........ G06F 17/30424; G06F 17/30958; G06N 7/00
USPC .......................................... 707/748
See application file for complete search history.

(56) References Cited

U.S. PATENT DOCUMENTS

| 8,499,008 B2 | 7/2013 | Pennacchiotti et al. |
| 8,589,408 B2 | 11/2013 | Xin et al. |
| 2007/0185868 A1* | 8/2007 | Roth ................. G06F 17/30908 707/999.006 |
| 2009/0281900 A1* | 11/2009 | Rezaei .................. G06Q 30/02 705/14.55 |
| 2010/0198823 A1 | 8/2010 | Tsoukalas et al. |
| 2013/0159317 A1 | 6/2013 | Huang et al. |

(Continued)

OTHER PUBLICATIONS

Marie-Francine Moens, Juanzi Li, and Tat-Seng Chua. 2014. Mining User Generated Content. Chapman & Hall/CRC.*

(Continued)

*Primary Examiner* — Pierre M Vital
*Assistant Examiner* — Alicia M Antoine
(74) *Attorney, Agent, or Firm* — Schwegman Lundberg & Woessner, P.A.

(57) ABSTRACT

Concept expansion using tables, such as web tables, can return entities belonging to a concept based on an input of the concept and at least one seed entity that belongs to the concept. A concept expansion frontend can receive the concept and seed entity and provide them to a concept expansion framework. The concept expansion framework can expand the coverage of entities for concepts, including tail concepts, using tables by leveraging rich content signals corresponding to concept names. Such content signals can include content matching the concept that appear in captions, early headings, page titles, surrounding text, anchor text, and queries for which the page has been clicked. The concept expansion framework can use the structured entities in tables to infer exclusive tables. Such inference differs from previous label propagation methods and involves modeling a table-entity relationship. The table-entity relationship reduces semantic drift without using a reference ontology.

18 Claims, 13 Drawing Sheets

(56) References Cited

U.S. PATENT DOCUMENTS

| | | | |
|---|---|---|---|
| 2013/0238621 A1* | 9/2013 | Ganjam | G06F 17/30864 707/737 |
| 2014/0172815 A1* | 6/2014 | Jammalamadaka | G06F 16/951 707/706 |
| 2014/0297658 A1 | 10/2014 | Kanigsberg et al. | |
| 2015/0052098 A1* | 2/2015 | Kveton | G06F 17/30731 706/52 |
| 2015/0100568 A1* | 4/2015 | Golden | G06F 17/30651 707/722 |
| 2016/0147892 A1* | 5/2016 | Gilbert | G06F 17/30867 707/738 |
| 2017/0061001 A1* | 3/2017 | Tonkin | G06N 5/04 |
| 2018/0053114 A1* | 2/2018 | Adjaoute | G06N 7/005 |

OTHER PUBLICATIONS

Agichtein, et al., "Snowball: Extracting Relations from Large Plain Text Collections", In Proceedings of the Fifth ACM Conference on Digital Libraries, Jun. 1, 2000, pp. 85-94.

Asur, et al., "A Viewpoint-Based Approach for Interaction Graph Analysis", In Proceedings of the 15th ACM SIGKDD International Conference on Knowledge Discovery and Data Mining, Jun. 28, 2009, pp. 79-87.

Benjelloun, et al., "Swoosh: A Generic Approach to Entity Resolution", In VLDB Journal The International Journal on Very Large Data Bases, vol. 18, Issue 1, Jan. 2009, pp. 255-276.

Bhagavatula, et al., "Methods for Exploring and Mining Tables on Wikipedia", In Proceedings of ACM SIGKDD Workshop on Interactive Data Exploration and Analytics, Aug. 11, 2013, pp. 19-27.

Bollacker, et al., "Freebase: A Collaboratively Created Graph Database for Structuring Human Knowledge", In Proceedings of the ACM SIGMOD International Conference on Management of Data, Jun. 9, 2008, pp. 1247-1249.

Cafarella, et al., "Data Integration for the Relational Web", In Proceedings of the VLDB Endowment, vol. 2, Issue 1, Aug. 2009, pp. 1090-1101.

Cafarella, et al., "WebTables: Exploring the Power of Tables on the Web", In Proceedings of the VLDB Endowment, vol. 1, Issue 1, Aug. 2008, pp. 538-549.

Carlson, et al., "Toward an Architecture for Never-Ending Language Learning", In Proceedings of Twenty-Fourth AAAI Conference on Artificial Intelligence, Jul. 11, 2010, 8 pages.

Curran, et al., "Minimising Semantic Drift with Mutual Exclusion Bootstrapping", In Proceedings of 10th Conference of the Pacific Association for Computational Linguistics, Sep. 19, 2007, 9 pages.

Dalvi, et al., "WebSets: Unsupervised Information Extraction Approach to Extract Sets of Entities from the Web", In Proceedings of 37th International Conference on Very Large Data Bases, Aug. 29, 2011, 9 pages.

Deng, et al., "A Generalized Co-HITS Algorithm and its Application to Bipartite Graphs", In Proceedings of the 15th ACM SIGKDD International Conference on Knowledge Discovery and Data Mining, Jun. 28, 2009, pp. 239-247.

Deng, et al., "Scalable Column Concept Determination for Web Tables using Large Knowledge Bases", In Proceedings of the VLDB Endowment, vol. 6, Issue 13, Aug. 2013, pp. 1606-1617.

Downey, et al., "Analysis of a Probabilistic Model of Redundancy in Unsupervised Information Extraction", In Journal Artificial Intelligence, vol. 174, Issue 11, Jul. 2010, 36 pages.

Etzioni, et al., "Unsupervised Named-Entity Extraction from the Web: An Experimental Study", In Journal Artificial Intelligence, vol. 165, Issue 1, Jun. 2005, 42 pages.

Fumarola, et al., "HyLiEn: A Hybrid Approach to General List Extraction on the Web", In Proceedings of 20th International Conference Companion on World Wide Web, Mar. 28, 2011, 2 pages.

"Getting started with the Concept Expansion Service", Retrieved on: Mar. 2, 2015 Available at: http://www.ibm.com/smarterplanet/us/en/ibmwatson/developercloud/doc/glimpseapi/.

Ghahramani, et al., "Bayesian Sets", In Proceedings of Nineteenth Annual Conference on Neural Information Processing Systems, Dec. 2005, 8 pages.

Google Knowledge Graph, Retrieved on: Mar. 9, 2015 Available at: Google Knowledge Graph.

"Google Web Tables", Retrieved on: Mar. 9, 2015 Available at: http://research.google.com/.

Granas, et al., "Fixed Point Theory", In Proceedings of Monographs in Mathematics, Mar. 9, 2015, 8 pages.

He, et al., "SEISA: Set Expansion by Iterative Similarity Aggregation", In Proceedings of the 20th International Conference on World Wide Web, Mar. 28, 2011, pp. 427-436.

"IBM Concept Expansion", Retrieved on: Mar. 9, 2015 Available at: http://www.ibm.com/smarterplanet/us/en/ibmwatson/developercloud/concept-expansion.html.

Ji, et al., "Knowledge Base Population: Successful Approaches and Challenges", In Proceedings of the 49th Annual Meeting of the Association for Computational Linguistics: Human Language Technologies—vol. 1, Jun. 19, 2011, pp. 1148-1158.

Kopliku, et al., "Retrieving Attributes Using Web Tables", In Proceedings of 11th Annual International ACM/IEEE Joint Conference on Digital Libraries, Jun. 13, 2011, pp. 397-398.

Lee, et al., "Attribute Extraction and Scoring: A Probabilistic Approach", In Proceedings of IEEE 29th International Conference on Data Engineering, Apr. 8, 2013, pp. 194-205.

Limaye, et al., "Annotating and Searching Web Tables using Entities, Types and Relationships", In Proceedings of Proceedings of the VLDB Endowment, vol. 3, Issue 1-2, Sep. 2010, pp. 1338-1347.

"Microsoft Power BI", Retrieved on: Mar. 9, 2015 Available at: http://www.microsoft.com/en-us/powerbi/default.aspx.

Navarro, Gonzalo, "A Guided Tour to Approximate String Matching", In Proceedings of ACM Computing Surveys, vol. 33, No. 1, Mar. 2001, 67 pages.

Pantel, et al., "Web-Scale Distributional Similarity and Entity Set Expansion", In Proceedings of Conference on Empirical Methods in Natural Language Processing: vol. 2, Aug. 6, 2009, pp. 938-947.

Pimplikar, et al., "Answering Table Queries on the Web using Column Keywords", In Proceedings of Proceedings of the VLDB Endowment, vol. 5, Issue 10, Jun. 2012, pp. 908-919.

Quercini, et al., "Entity Discovery and Annotation in Tables", In Proceedings of the 16th International Conference on Extending Database Technology, Mar. 18, 2013, pp. 693-704.

Sarma, et al., "Finding Related Tables", In Proceedings of ACM SIGMOD International Conference on Management of Data, May 20, 2012, 12 pages.

Sarmento, et al., ""More like these": Growing Entity Classes from Seeds", In Proceedings of the Sixteenth ACM Conference on Information and Knowledge Management, Nov. 6, 2007, pp. 959-962.

Suchanek, et al., "Knowledge Harvesting from Text and Web Sources", In Proceedings of IEEE 29th International Conference on Data Engineering, Apr. 8, 2013, pp. 1250-1253.

Suchanek, et al., "Yago: A Core of Semantic Knowledge Unifying Wordnet and Wikipedia", In Proceedings of the 16th International Conference on World Wide Web, May 8, 2007, pp. 697-706.

Talukdar, et al., "Experiments in Graph-based Semi-Supervised Learning Methods for Class-Instance Acquisition", In Proceedings of the 48th Annual Meeting of the Association for Computational Linguistics, Jul. 11, 2010, pp. 1473-1481.

Venetis, et al., "Recovering Semantics of Tables on the Web", In Proceedings of Proceedings of the VLDB Endowment, vol. 4, Issue 9, Jun. 1, 2011, pp. 528-538.

Wang, et al., "Expansion of Tail Concept using Web Tables", In Techincal Report, Mar. 9, 2015, 29 pages.

Wang, et al., "Iterative Set Expansion of Named Entities Using the Web", In Proceedings of the Eighth IEEE International Conference on Data Mining, Dec. 15, 2008, pp. 1091-1096.

Wang, et al., "Language-Independent Set Expansion of Named Entities Using the Web", In Proceedings of the Seventh IEEE International Conference on Data Mining, Oct. 28, 2007, 9 pages.

Wang, et al., "Understanding Tables on the Web", In Proceedings of the 31st International Conference on Conceptual Modeling, Oct. 15, 2012, 14 pages.

(56) References Cited

OTHER PUBLICATIONS

West, et al., "Knowledge Base Completion via Search-Based Question Answering", In Proceedings of the 23rd International Conference on World Wide Web, Apr. 7, 2014, pp. 515-526.

Wu, et al., "Probase: A Probabilistic Taxonomy for Text Understanding", In Proceedings of the ACM SIGMOD International Conference on Management of Data, May 20, 2012, pp. 481-492.

Yahya, et al., "ReNoun: Fact Extraction for Nominal Attributes", In Proceedings of Conference on Empirical Methods in Natural Language Processing, Oct. 25, 2014, pp. 325-335.

Yakout, et al., "InfoGather: Entity Augmentation and Attribute Discovery by Holistic Matching with Web Tables", In Proceedings of the ACM SIGMOD International Conference on Management of Data, May 20, 2012, pp. 97-108.

Yin, et al., "FACTO: A Fact Lookup Engine Based on Web Tables", In Proceedings of 20th International Conference on World Wide Web, Mar. 28, 2011, pp. 507-516.

Zhang, et al., "InfoGather+: Semantic Matching and Annotation of Numeric and Time-Varying Attributes in Web Tables", In Proceedings of the ACM SIGMOD International Conference on Management of Data, Jun. 22, 2013, pp. 145-156.

\* cited by examiner

Algorithm 1: CONCEPTEXPAND

Input: Entity set $E$, table set $T$, seed entity set $S$, table likelihood threshold $\alpha$
Output: entity score $\{x_i | e_i \in E\}$, table score $\{y_j | t_j \in T\}$ 1  Initialize the support table set $T_0 \leftarrow \emptyset$;
2  Initialize the excluded entity set $U \leftarrow E \setminus S$;
3  Initialize seed entity score $x_i$ using prior, for $e_i \in S$;
4  repeat
5  $\quad$ Update
   $\quad y_j \leftarrow f_{E \rightarrow T}(\{x_i | e_i \in t_j, e_i \notin U\} \cup \{\pi_j | e_i \in t_j \cap U\})$
   $\quad$ for $t_j \in T$;
6  $\quad$ Choose the optimal $(y^*, t^*) = \max_{t_j \notin T_0, |t \setminus U| > 0} y_j$;
7  $\quad T_0 \leftarrow T_0 \cup \{t^*\}$;
8  $\quad$ Update $x_i \leftarrow f_{T \rightarrow E}(\{y_j | t_j \ni e_i, t_j \in T_0\})$ for $e_i \in t^*$;
9  $\quad U \leftarrow U \setminus t^*$;
10 until $y^* < \alpha$ or $T_0 = T$;
11 repeat
12 $\quad T_0 \leftarrow T_0 \setminus \{t \in T_0, |t \setminus U| < |t \cap U|\}$;
13 $\quad U = U \cup \{e \in E \setminus U, |T(e) \cap T_0| \leq 1\}$;
14 until $U$ *stops growing*;
15 repeat
16 $\quad$ Update $y_j \leftarrow f_{E \rightarrow T}(\{x_i | e_i \in t_j\})$ for $t_j \in T_0$;
17 $\quad$ Update $x_i \leftarrow f_{T \rightarrow E}(\{y_j | t_j \ni e_i\})$ for $e_i \in E \setminus U$;
18 until $x_i$*'s converge*;

FIG. 6

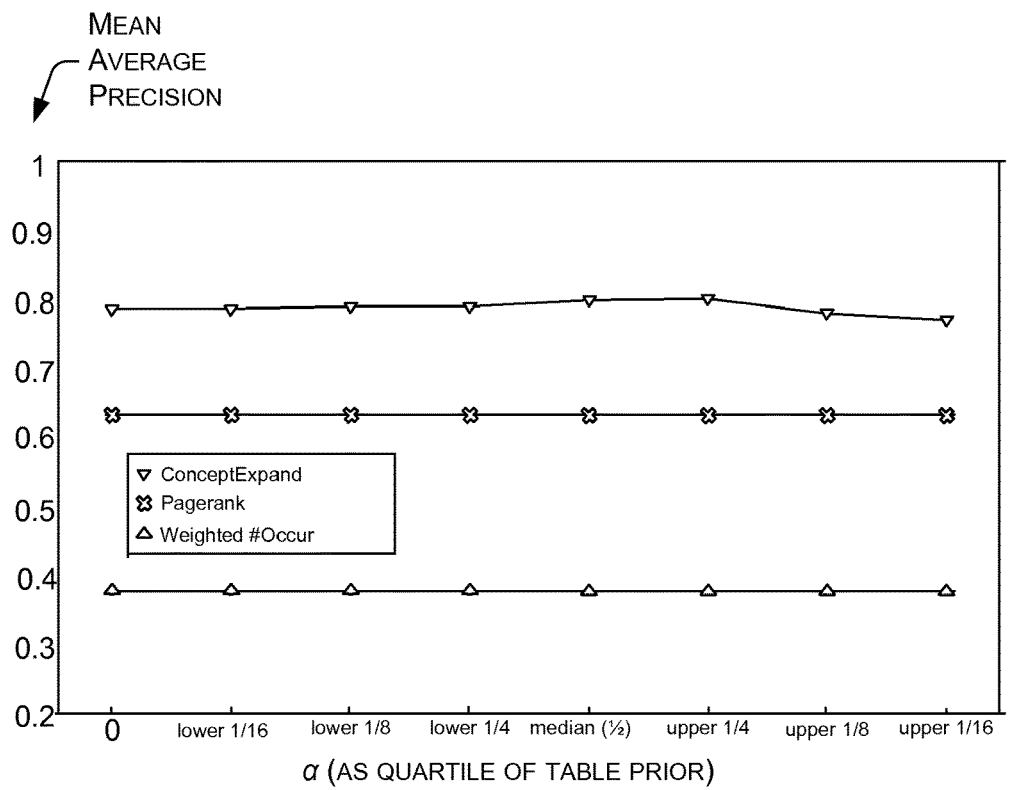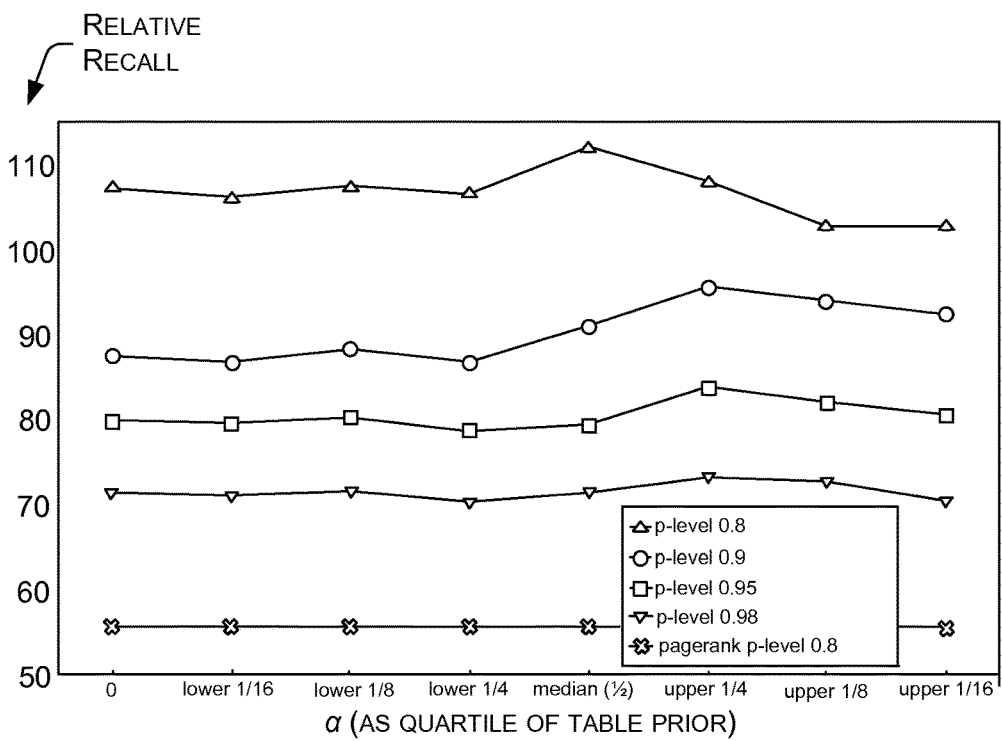
FIG. 13

CONCEPT EXPANSION USING TABLES

BACKGROUND

Existing knowledgebases focus on popular concepts such as persons, organizations, and locations. However, there are a great number of concepts in addition to the most popular concepts. These additional concepts make up a long tail when concepts are plotted. Typically tail concepts may be found in concept-entity pairs, which are extracted from text documents. Currently, concept-entity pairs cover a limited number of entities per concept due to insufficient mentions in text. Moreover, because a tail concept often overlaps many other concepts, it is challenging to apply existing techniques to tail concepts.

SUMMARY

The techniques and constructs discussed herein facilitate concept expansion using tables such as web tables. This disclosure describes systems, methods, and computer-readable media for returning substantially all, most, many, or a predetermined number of entities belonging to a concept based on an input of the concept and a few seed entities that belong to the concept. In some examples, a concept expansion frontend can receive the name of a concept and a few seed entities belonging to the concept and provide the concept name and the seed entities to a concept expansion framework. The concept expansion framework can expand the coverage of entities for tail concepts using tables, such as web tables, by leveraging rich content signals corresponding to concept names. Such content signals can include content matching the concept name that appear in captions, early headings, page titles, surrounding text, anchor text, and queries for which the page has been clicked. The concept expansion framework can use the structured entities in tables, such as web tables, to infer exclusive tables. Such inference differs from previous label propagation methods. The inference described herein involves modeling a particular table-entity relationship. The described table-entity relationship reduces semantic drift without using a reference ontology. For example, with a concept name and two seed entities as input, the concept expansion framework can augment thousands of tail concepts with significant recall boost while maintaining effective precision.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 is an example algorithm for ranking employed by a concept expansion framework, according to various examples described herein.

FIG. 13 illustrates mean average precision and relative recall at different precision levels for stopping criterion.

DETAILED DESCRIPTION

Overview

Figure 1:
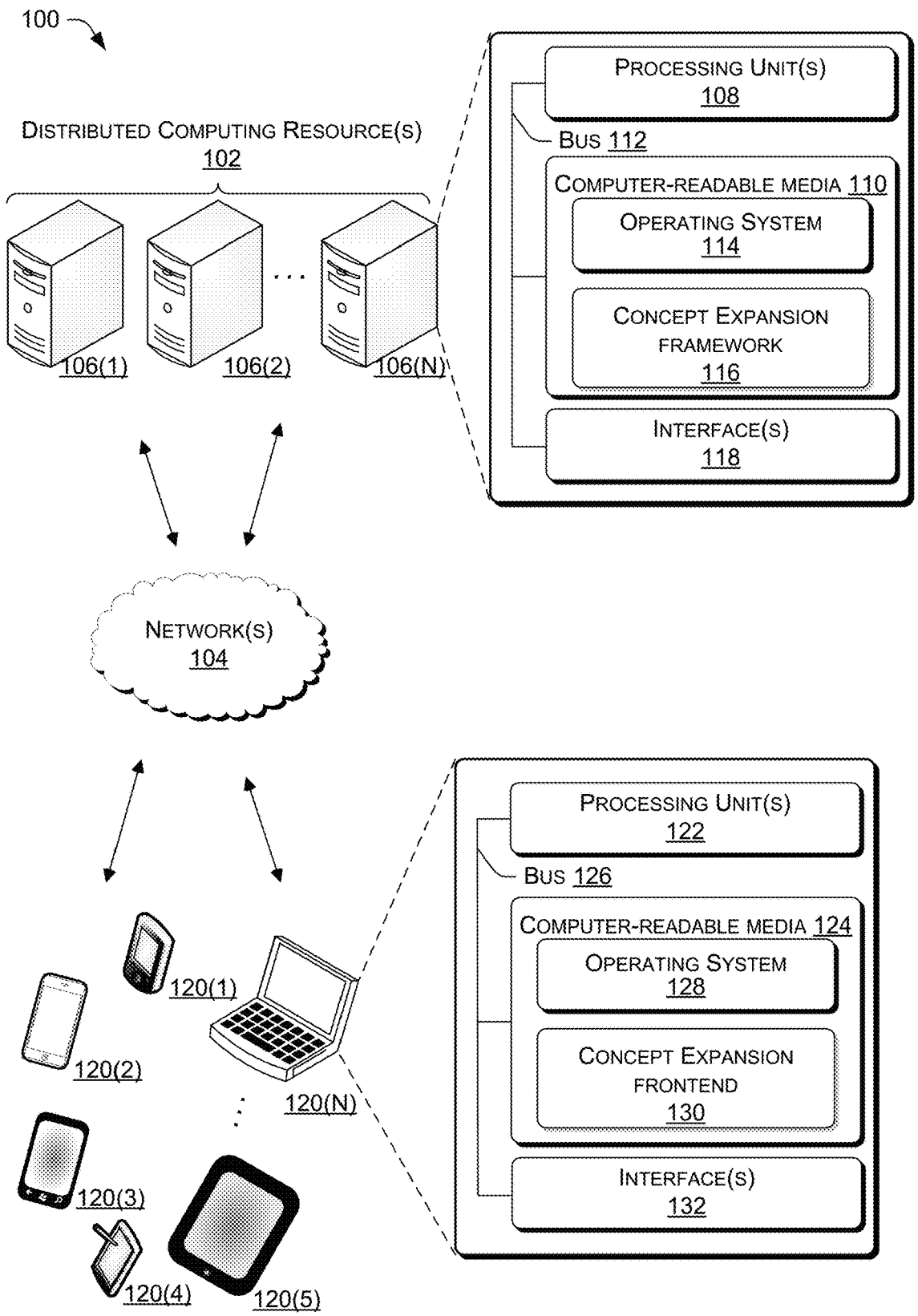
FIG. 1 is a block diagram depicting an example environment for implementing concept expansion using tables as described herein.

Examples described herein provide techniques and constructs to improve search results, including for other than the most popular concepts. Less popular concepts make up a long tail of concepts, which are still relevant to a large number of search queries. Concept expansion improves search results for concepts, including for tail concepts, identified from tables such as from web tables, using resources including, for example, processing units and accelerators. Such resources may be implemented using specialized programming. For example, resources may have different execution models as is the case for graphics processing units (GPUs) and computer processing unit (CPUs).

The concept expansion framework can include one or many computing resources such as distributed computing resources, e.g., in a cluster such as a cloud service.

Resources configured for concept expansion using tables, use data associated with tables, such as text associated with web tables, to process a query. In some instances, the resources process the query based on a graph created between entities including at least one seed entity and tables. In some examples the graph includes a bipartite graph. Concept expansion involves identifying exclusive tables and identifying whether entities included in exclusive tables are relevant to the query concept.

Some examples described herein can improve the functioning of computing technology. As used herein, the term "computing" used with reference to clusters, nodes, and jobs such as queries refers generally to computation, data manipulation, or other programmatically-controlled operations. The term "resource" used with reference to clusters, nodes, and jobs such as queries refers generally to any commodity or service provided by the cluster for use in performing jobs such as queries. For example, computing jobs can include disk-intensive operations such as running complex database queries over large datasets striped over numerous hard drives. Computing jobs can additionally or alternatively include network-intensive operations such as shuffling data between many map nodes and many reduce nodes between phases of a map/reduce process. Computing jobs can additionally or alternatively use relatively small amounts of various resources, e.g., a network time-of-day service. Computing jobs can additionally or alternatively include memory-intensive operations such as rotating image data for inkjet printing, streaming video from main memory or network-interface memory to graphics-processor memory, or computing memory-based hashcash for sending verified emails. Computing jobs can additionally or alternatively include heavily processor-intensive operations such as computing large numbers of digits of π. Resources can include processors, processor cycles, disk space, random-access memory space, network bandwidth (uplink, downlink, or both), prioritized network channels such as those used for communications with quality-of-service (QoS) guarantees, backup tape space or mounting/unmounting services, electrical power, etc.

In some examples, statistical modeling can be used to estimate the performance of computing jobs on a node when a new computing job is added to that node, e.g., alongside existing jobs. For example, regression analysis can be used, taking state or profiling variables or counters of the node as input and providing expected performance as output. The expected performance can then be compared to a threshold to determine whether the new computing job can be added to that node without causing service level agreement (SLA) violations of any of the running jobs. This process can be repeated for multiple nodes to find candidate nodes that can accept the new computing job while maintaining SLA performance.

Various environments, configurations of resources, and methods for performing concept expansion using tables are described further with reference to FIGS. 1-13. While many examples described herein relate to servers and other non-consumer electronic devices, other types of electronic devices can be used, e.g., as discussed with reference to FIG. 1.

Illustrative Environment

FIG. 1 shows an example environment 100 in which examples of concept expansion can be performed. In some examples, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standardss, e.g., BLUETOOTH, cellular-telephony standards such as GSM, LTE, or WiMAX, or multiples or combinations thereof.

In various examples, distributed computing resources 102 include devices 106(1)-106(N) (individually or collectively referred to herein with reference 102), where N is any integer greater than or equal to 1. Examples support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile devices, special purpose-type devices, embedded-type devices, and/or wearable-type devices. Thus, although illustrated as desktop computers, device(s) 106 can include a diverse variety of device types and are not limited to a particular type of device. Device(s) 106 can represent, but are not limited to, server computers or blade servers such as Web servers, map/reduce servers or other computation engines, or network-attached-storage units, desktop computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) 106 can include any type of computing device having one or more processing unit(s) 108 operably connected to computer-readable media 110 such as via a bus 112, which in some instances can include one or more of a system bus, a data bus, an address bus, a PCI bus, a Mini-PCI bus, and any variety of local, peripheral, and/or independent buses. Executable instructions stored on computer-readable media 110 can include, for example, an operating system 114, a concept expansion framework 116, and other modules, programs, or applications that are loadable and executable by processing units(s) 108. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Device 106 can also include one or more interfaces 118, such as a user interface or a network interface to enable communications between computing device 106 and other networked devices such as consumer computing device(s)

120 involved in concept expansion, or other device(s) 106 over network(s) 104. Such interface(s) 118 can include one or more input/output devices and/or one or more network interface controllers (NICs) or other types of transceiver devices to send and receive communications over a network. For simplicity, other components are omitted from the illustrated device 106.

Other devices involved in concept expansion can include devices 120(1)-120(K) (individually or collectively referred to herein with reference 120), where K is any integer greater than or equal to 1. In some examples, N=K; in other examples, N>K or N<K. In the illustrated example, computing device(s) 120 can be clients of distributed computing resources 102 and can submit queries to computing resources 102 and/or receive results from computing resources 102. Computing devices 106(1)-106(N) in computing resources 102 can, e.g., share resources, balance load, increase performance, or provide fail-over support or redundancy. Computing devices 120 can additionally or alternatively operate in a cluster or grouped configuration.

Device(s) 120 can belong to a variety of categories or classes of devices such as traditional client-type devices, desktop computer-type devices, mobile devices, special purpose-type devices, embedded-type devices, and/or wearable-type devices. Thus, although illustrated as mobile computing devices, which may have less computing resources than device(s) 106, consumer computing device(s) 120 can include a diverse variety of device types and are not limited to any particular type of device. Consumer computing device(s) 120 can include, but are not limited to, computer navigation type consumer computing devices 120(1) such as satellite-based navigation systems including global positioning system (GPS) devices and other satellite-based navigation system devices, telecommunication devices such as mobile phone 120(2) mobile phone tablet hybrid 120(3), personal data assistants (PDAs) 120(4), tablet computers 120(5), laptop computers such as 120(N), other mobile computers, wearable computers, implanted computing devices, desktop computers, personal computers, automotive computers, network-enabled televisions, thin clients, terminals, game consoles, gaming devices, work stations, media players, personal video recorders (PVRs), set-top boxes, cameras, integrated components for inclusion in a computing device, appliances, or any other sort of computing device.

Consumer computing device(s) 120 can represent any type of computing device having one or more processing unit(s) 122 operably connected to memory 124 such as via a bus 126, which in some instances can include one or more of a system bus, a data bus, an address bus, a PCI bus, a Mini-PCI bus, and any variety of local, peripheral, and/or independent buses.

Executable instructions stored on memory 124 can include, for example, an operating system 128, a concept expansion frontend 130, and other modules, programs, or applications that are loadable and executable by processing units(s) 122. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Consumer computing device 120 can also include one or more interfaces 132 such as user interfaces to enable user input to the device 120 and/or network interfaces to enable communications between computing device 120 and other networked devices such as other computing device(s) 120 or devices 106 over network(s) 104. Such interface(s) 132 can include one or more user input/output devices and/or network interface controllers (NICs) or other types of transceiver devices to send and receive communications over a network.

Different devices or types of computing devices 106 and 120 can have different needs or ways of interacting with distributed computing resources 102. For example, devices 120 can interact with distributed computing resources 102 with discrete request/response communications, e.g., for time synchronization. In some examples, devices 120 can serve as clients for remote-login or remote-desktop interactions, such as the MICROSOFT WINDOWS Remote Desktop Protocol (RDP) or the X WINDOW SYSTEM core protocol. Such interactions can support, for example, line-of-business (LOB) applications such as word-processors or spreadsheets, or games such as low-bandwidth turn-based games or high-end games (HEG) such as first-person exploration games. In remote-desktop interactions, the communications between device 120 and devices 106 in distributed computing resources 102 can be constrained to have at least a certain bandwidth and/or at most a certain latency.

In some examples, devices 106 or 120 can communicate with each other or with other computing devices via one or more network(s) 104. In some examples, computing devices 106 and 120 can communicate with external devices via network(s) 104. For example, network(s) 104 can include public networks such as the Internet, private networks such as an institutional or personal intranet, or combination(s) of private and public networks. Network(s) 104 can also include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Network(s) 104 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, network(s) 104 can also include a number of devices that facilitate network communications or form a hardware infrastructure for the networks, such as switches, routers, gateways, access points, firewalls, base stations, repeaters, backbone devices, and the like. Network(s) 108 can also include devices that facilitate communications between computing devices 102 or 104 using bus protocols of various topologies, e.g., crossbar switches, INFINIBAND switches, or FIBRE CHANNEL switches or hubs.

Different networks have different characteristics, e.g., bandwidth, latency, accessibility (open, announced but secured, or not announced), or coverage area. The type of network 104 used for any given connection between, e.g., a computing device 120 and distributed computing resource(s) 102 can be selected based on these characteristics and on the type of interaction. For example, a low-latency network can be selected for high-end game interactions.

Processing unit(s) 122 can be or include one or more single-core processors, multi-core processors, central processing units (CPUs), GPUs, general-purpose graphics processing units (GPGPUs), or hardware logic components configured, e.g., via specialized programming from modules or APIs, to perform functions described herein. For example, and without limitation, illustrative types of hardware logic components that can be used in or as processing units 122 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 122 can represent a hybrid device, such as a device from ALTERA or XILINX that includes a CPU core embedded in an FPGA fabric. These or other hardware logic components can operate independently or, in some instances, can be driven by a CPU. In some examples, at least some of computing device(s) 102 or 104 can include a plurality of processing units 122 of multiple types. For example, the processing units 122 in computing device 102(2) can be a combination of one or more GPGPUs and one or more FPGAs. Different processing units 122 can have different execution models, e.g., as is the case for graphics processing units (GPUs) and central processing unit (CPUs).

Computer-readable media described herein, e.g., computer-readable media 110 or 124, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 106 or 120.

In contrast to computer storage media, communication media can embody computer-readable instructions, data structures, program modules, or other data in a modulated data signal, such as a carrier wave, or other transmission mechanism. As defined herein, computer storage media does not include communication media.

In some examples, computer-readable media 110 or 124 can store instructions executable by the processing unit(s) 108 or 122 that, as discussed above, can represent a processing unit incorporated in computing device 106 or 120, respectively. Computer-readable media 110 or 124 can additionally or alternatively store instructions executable by external processing units such as by an external CPU or external processor of any type discussed above. In some examples at least one processing unit 108 or 122, e.g., a CPU, GPU, or hardware logic device, can be incorporated in computing device 106 or 120, while in some examples at least one processing unit 108 or 122, e.g., one or more of a CPU, GPU, or hardware logic device, can be external to computing device 106 or 120, respectively.

Computer-readable media 110 or 124 of the computing device 106 or 120 can store an operating system 114 or 128. In some examples, operating system 114 or 128 is not used (commonly referred to as a "bare metal" configuration). In some examples, operating system 114 or 128 can include components that enable or direct the computing device 106 or 120 to receive data via various inputs (e.g., user controls, network or communications interfaces, memory devices, or sensors), and process the data using the processing unit(s) 108 or 122 to generate output. The operating system 114 or 128 can further include one or more components that present the output (e.g., display an image on an electronic display, store data in memory, and/or transmit data to another computing device). The operating system 114 or 128 can enable a user, e.g., an end user, an administrator, a designate, or a supervisor, to interact with the computing device 106 or 120 using an interface 118 or 132. Additionally, the operating system 114 or 128 can include components that perform various functions generally associated with an operating system, e.g., storage management and internal-device management.

In some examples, computing device 106 or 120 can include one or more interfaces 118 or 132, respectively. As a user interface, interfaces 118 and 132 can include one or more output devices configured for communication to a user or to another computing device 106 or 120. Output devices can be integral or peripheral to computing device 106 or 120. Examples of output devices can include a display, a printer, audio speakers, beepers, or other audio output devices, a vibration motor, linear vibrator, or other haptic output device, and the like. As a user interface, interfaces 118 and 132 can include one or more input devices, integral or peripheral to computing device 106 or 120. The input devices can be user-operable, or can be configured for input from other computing device 106 or 120. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device, a gestural input device such as a touchscreen, a grip sensor, an accelerometer, another haptic input, a visual input device such as one or more cameras or image sensors, and the like.

Illustrative Components

Figure 2:
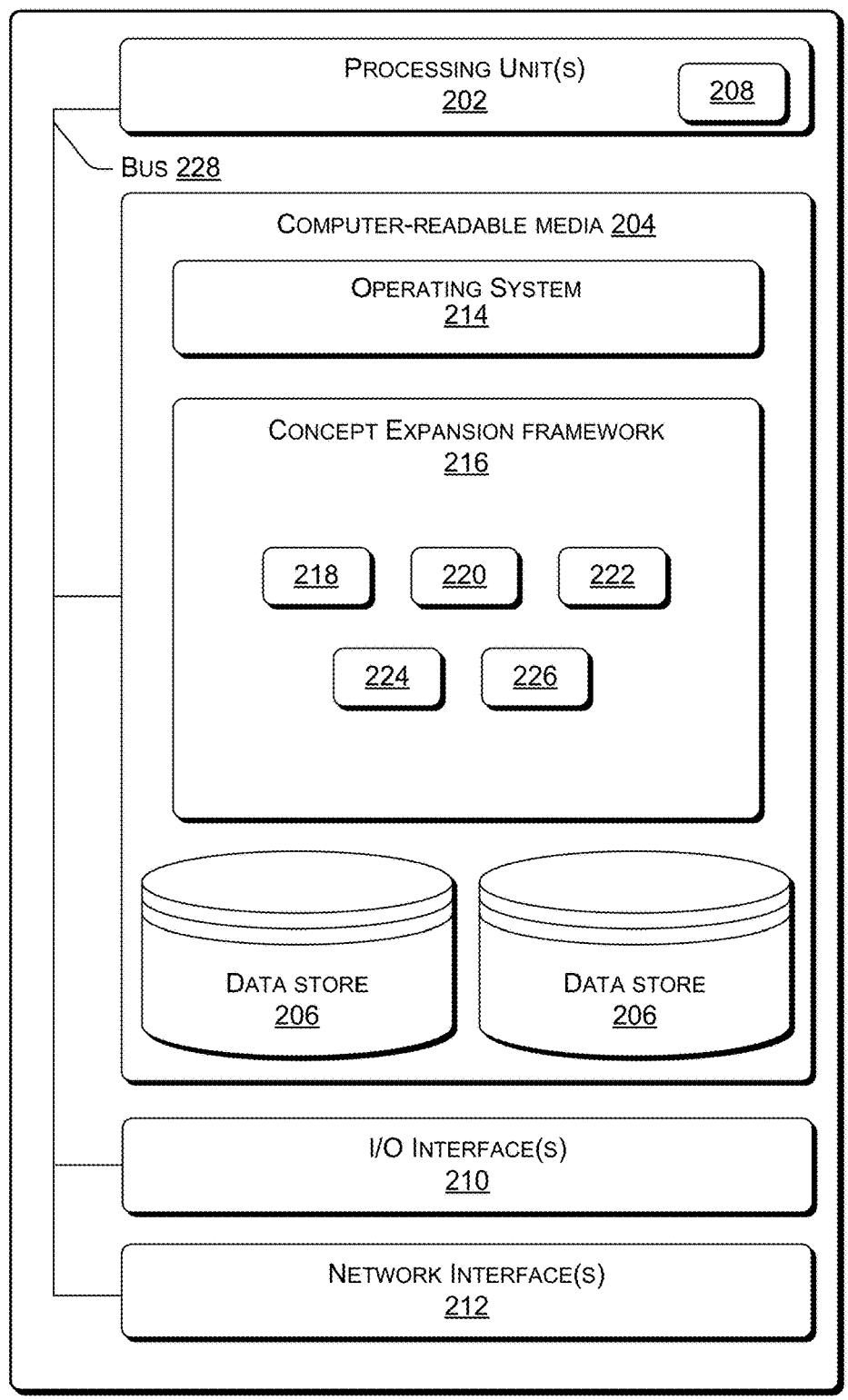
FIG. 2 is a block diagram depicting an example computing device configured to participate in concept expansion as described herein.

FIG. 2 is a block diagram depicting an example computing device 200 of a distributed computing resource, such as a device 106 from FIG. 1. In device(s) 200, processing unit(s) 202, can include processing unit(s) 108 and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, computer-readable media 204 can include computer-readable media 110 and can store instructions executable by the processing unit(s) 202, which as discussed above, can represent a processing unit incorporated in device 200. Computer-readable media 204 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in device 200, while in some examples one or more of a CPU, GPU, and/or accelerator is external to device 200.

In the illustrated example, computer-readable media 204 also includes one or more data store(s) 206. In some examples, data store(s) 206 includes data storage such as a database, data warehouse, or other type of structured or unstructured data storage. In some examples, data store(s) 206 includes a corpus and/or a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store(s) 206 can store data for the operations of processes, applications, components, and/or modules stored in computer-readable media 204 and/or executed by processing unit(s) and/or accelerator(s) 202. Alternately, some or all of the above-referenced data can be stored on separate memories 208, which can include memory on board one or more processing unit(s) 202 such as a memory on board a CPU-type processor, a GPU-type processor, an FPGA-type accelerator, a DSP-type accelerator, and/or another accelerator.

Device(s) 200 can further include one or more input/output (I/O) interfaces 210 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 200, network interface(s) 212, which can be network interface(s) 118, can represent, for example, network interface controllers (NICs) or other types of transceiver devices to send and receive communications over a network.

In the illustrated example, computer-readable media 204 also includes an operating system 214, which can include operating system 114. Computer-readable media 204 also includes a concept expansion framework 216, which can include concept expansion framework 116. Concept expansion framework 216 can include one or more modules and/or APIs, which are illustrated as blocks 218, 220, 222, 224, and 226, although this is just an example, and the number can vary higher or lower.

Functionality described associated with blocks 218, 220, 222, 224, and 226 can be combined to be performed by a fewer number of modules and/or APIs or it can be split and performed by a larger number of modules and/or APIs. For example, block 218 can represent a receiver module with logic to program processing unit 202 of device 200 for extraction of one or more concepts and one or more seed entities from a query for use with tables, such as web tables.

Block 220 can represent an expansion module with logic to program processing unit 202 for performing concept expansion using at least one concept and one or more seed entities received from the receiver module with at least one table of a plurality of tables. For example, expansion module 220 can identify exclusive tables and relevant entities. A table is exclusive if and only if the entities of the table are relevant to the concept. An entity is relevant if it appears in at least one exclusive table. In some examples, the expansion module 220 further includes logic to distinguish between types of tables.

Block 222 can represent a ranking module with logic to program processing unit 202 of device 200 for ranking one or more types of data including ranking entities and ranking tables. For example, ranking module 222 can represent a probabilistic model that holistically ranks the entities and tables. Ranking module 222 can model a score of a table as 'how likely the entire table is exclusive.' This is in contrast to conventional table ranking, which models a score of a table as 'the fraction of the table that is relevant.' In modeling the score for a table, ranking module 222 respects the asymmetric entity-table relationship: an exclusive table must contain only relevant entities while a relevant entity can appear in a non-exclusive table. Ranking module 222 can propagate the score from table to entity and entity to table asymmetrically and can aggregate the score nonlinearly to emulate taking 'all or none' from exclusive or nonexclusive tables, respectively.

Block 224 can represent a graphing module with logic to program processing unit 202 of device 200 for generating a graph, such as a bipartite graph, between entities including at least one seed entity and data associated with tables, such as web tables. Data associated with tables can include headers, column names, row names, cell values, and/or annotations, etc. Although in describing the examples herein particular reference may be made to aspects of columns and rows, one of ordinary skill in the relevant art will recognize that the organization of columns and rows can be swapped as is known in the art. Accordingly, should such a swap occur, aspects described herein as referring to columns can then refer to rows, and aspects referring to rows herein can then refer to columns.

Block 226 can represent an output module with logic to program processing unit 202 of device 200 for producing results to the query according to one or more of the expansion module 220, the ranking module 222, and/or the graphing module 224. In some examples, the output module 226 can be configured to store results of the query in the data store 206.

Bus 228, which can include bus 112, and which in some instances can include one or more of a system bus, a data bus, an address bus, a PCI bus, a Mini-PCI bus, and any variety of local, peripheral, and/or independent buses, can operably connect computer-readable media 204 to processing unit(s) 202.

Figure 3:
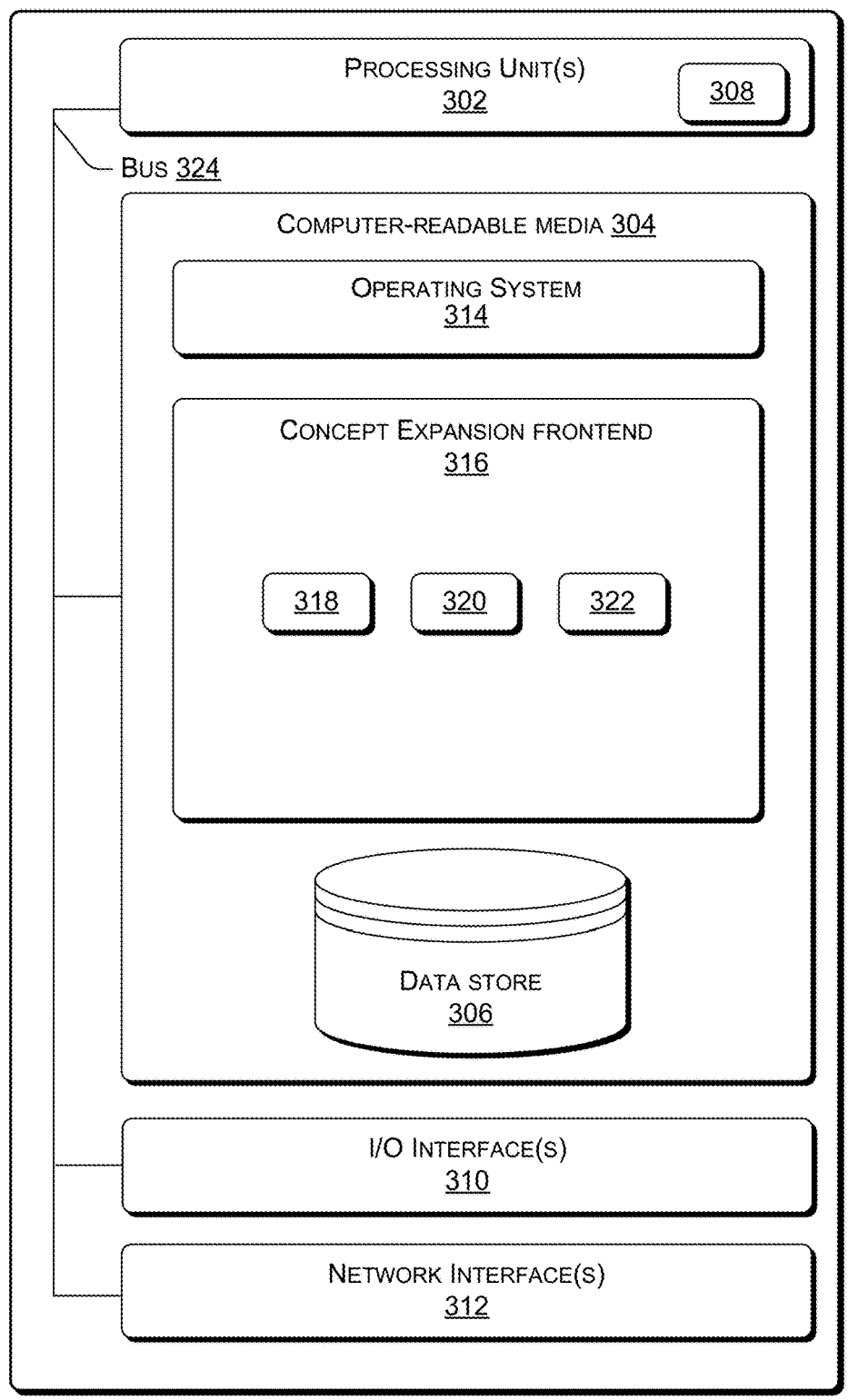
FIG. 3 is a block diagram depicting an example computing device configured to participate in concept expansion as described herein.

FIG. 3 is a block diagram depicting an example consumer computing device 300, such as a computing device 120 from FIG. 1. In device(s) 300, processing unit(s) 302 can include processing unit(s) 122 and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, computer-readable media 304 can include computer-readable media 124 and can store instructions executable by the processing unit(s) 302, which as discussed above, can represent a processing unit incorporated in device 300. Computer-readable media 304 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in device 300, while in some examples one or more of a CPU, GPU, and/or accelerator is external to device 300.

In the illustrated example, computer-readable media 304 also includes a data store 306. In some examples, data store 306 includes data storage such as a database, data warehouse, or other type of structured or unstructured data storage. In some examples, data store 306 includes a corpus and/or a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store 306 can store data for the operations of processes, applications, components, and/or modules stored in computer-readable media 304 and/or executed by processing unit(s) and/or accelerator(s) 302. Alternately, some or all of the above-referenced data can be stored on separate memories 308, which can include memory on board one or more processing unit(s) 302 such as a memory on board a CPU-type processor, a GPU-type processor, an FPGA-type accelerator, a DSP-type accelerator, and/or another accelerator.

Device(s) 300 can further include one or more input/output (I/O) interfaces 310 to allow device 300 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 300, network interface(s) 312, which can include network interface(s) 132, can represent, for example, network interface controllers (NICs) or other types of transceiver devices to send and receive communications over a network.

In the illustrated example, computer-readable media 304 also includes an operating system 314, which can include operating system 128. Computer-readable media 304 also includes a concept expansion frontend 316, which can include concept expansion frontend 130. Concept expansion frontend 316 can include one or more modules and/or APIs, which are illustrated as blocks 318, 320, and 322, although this is just an example, and the number can vary higher or lower.

Functionality described associated with blocks 318, 320, and 322 can be combined to be performed by a fewer number of modules and/or APIs or it can be split and performed by a larger number of modules and/or APIs. For example, block 318 can represent an input module with logic to program processing unit 302 of device 300 for receiving a concept and one or more seed entities belonging to the concept to form a query for concept expansion.

Block 320 can represent a communication module with logic to program processing unit 302 for communicating the concept and seed entities to a concept expansion framework. In at least one example, communication module 320 includes logic to program processing unit 302 to receive communication of results to the query. In various examples, communication module 320 can cause the concept, seed entities, query, and/or query results to be stored in data store 306.

Block 322 can represent an output module with logic to program processing unit 302 of device 300 for producing results to the query as received by communications module 320.

Bus 324, which can include bus 126, and which in some instances can include one or more of a system bus, a data bus, an address bus, a PCI bus, a Mini-PCI bus, and any variety of local, peripheral, and/or independent buses, can operably connect memory 304 to processing unit(s) 302.

Figure 4:
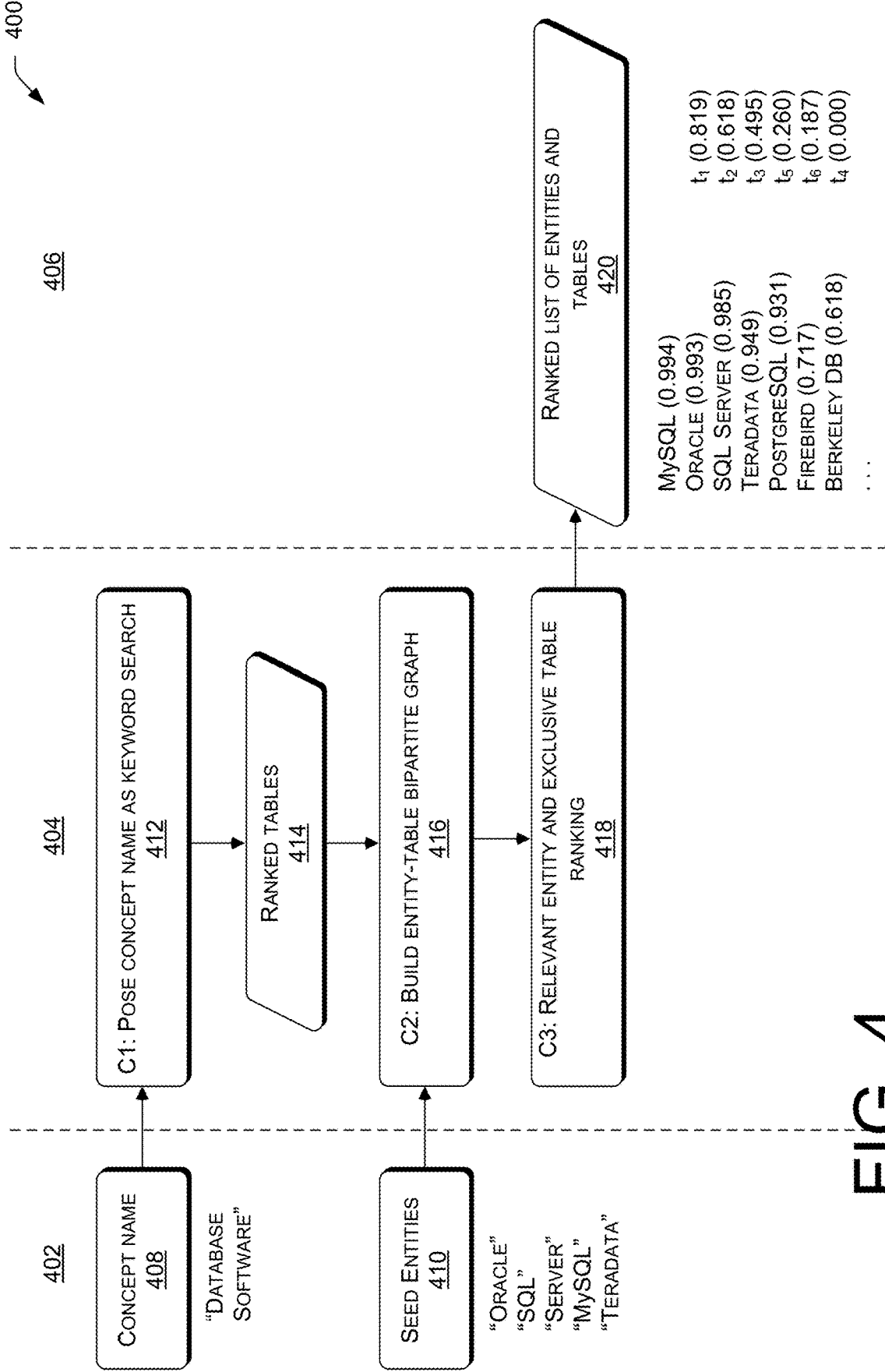
FIG. 4 is a block diagram depicting an example process architecture that can perform content expansion as described herein.

FIG. 4 is a block diagram depicting an example architecture of processes that concept expansion framework 216 and/or concept expansion frontend 316 can perform to facilitate concept expansion using tables as described herein. The architecture 400 includes a receiving portion 402, an expansion portion 404, and an output portion 406.

In the receiving portion 402, as illustrated at 408, one or a number of computing devices, such as device(s) 106 of distributed computing resources 102 and/or consumer device 120, receive a word or phrase as a concept or concept name as input. In the illustrated example the concept is "database software."

Also in the receiving portion 402, as illustrated at 410, one or a number of computing devices, such as device(s) 106 of distributed computing resources 102 and/or consumer device 120, receive a one or more seed entities as input. In the illustrated example the seed entities are "Oracle," "SQL," "Server," "MySQL," and "Teradata." For example, receiver module 218 of device 200 can receive a concept name and seed entity. In some examples, receiver module 218 can receive one or both of the concept and seed entity from communications module 320 of device 300. In various example, communications module 320 can have received one or both of the concept and seed entity from input module 318.

Notably, concept expansion as described herein does not require negative examples or knowledge of other concepts. Concept expansion as described herein can leverage structured data and text data associated with tables, such as the millions of tables on the web. This setting has several unique benefits for expansion of tail concepts. First, a web table is often structured as rows about entities pertaining to a coherent, fine-grained concept. Second, the text mentioned in the caption, surrounding text, and/or nearest headings etc. of a table can help identify tables about the received concept. This can provide opportunities for indexing and searching the identified tables with a search system such as web table search system (WTS) like Microsoft's Excel Power Query™, Google's Web Tables™, etc.

In the expansion portion 404, as illustrated at 412, one or a number of computing devices, such as device(s) 106 of distributed computing resources 102 and/or consumer device 120, can pose the received concept or concept name as a keyword search to a search system. For example, expansion module 220 of device 200 can pose the concept or concept name from receiver module 218. At 412 the system described herein can retrieve a set of tables such as web tables from which relevant entities can be identified. In at least one example, a quality set of retrieved tables includes (i) most of the tables containing relevant entities and (ii) few tables that contain no relevant entities.

In various examples, various algorithms may be customized to obtain a quality set of retrieved tables. While some may work well for broad concepts (e.g., city, country), such as an algorithm that obtains tables whose subject column name matches the concept name, such an algorithm misses most tables for specific concepts such as those shown in Table 1.

TABLE 1

Example Concepts

| | | |
|---|---|---|
| asian country | third world country | trading partner |
| internet company | multiplayer game | national newspaper |
| adverse side effect | fitness class | flu-like symptom |
| antifungal agent | bacterial species | cytotoxic agent |
| grape variety | mammal species | memory card |

Thus, at 412 the concept expansion system described herein can leverage rich content signals such as those associated with web tables. For example, concept names typically appear in captions, nearest headings (h2, h3, h4), page titles, surrounding text, incoming anchor text and/or queries for which the page has been clicked. In some cases, these criteria are used by a search system to return tables by keyword queries. At 412 the content expansion system, such as the expansion module 220, can pose a concept name to a search system and use the returned list of tables for further investigation. To obtain a reasonable amount of exclusive tables, the system can be set to retrieve a large number of tables from a search system (such as 1,000, or another predetermined number). Various search systems, such as WTS, rank positions, and/or other positions based on relevance, can be used as distant prior knowledge for exclusivity-aimed ranking. The concept expansion system as described herein can, for example, assume $t_j$ refers to the table ranked at position j by a search system, and that the search system outputs the identity of the subject column for each returned table.

Table 2, below, shows example results from a ranking algorithm as described herein. For two concepts from Table 1, given the seed entities listed, Table 2 illustrates example kinds of entities the concept expansion system described herein found for the concepts from different domains. For example, given the seed entities "addiction" and "depression," for the concept "adverse side effect," Table 2 shows returned entities "headache, nausea, diarrhea, insomnia, dizziness, constipation." The illustrated results are a reflection of the returned entities being present in many exclusive tables. However, this is not a complete list of the results, and other adverse side effects are found in a complete list. In the other illustrated example, given the seed entities "nebbiolo" and "barbera," which are traditional Italian grape varietals for the concept "grape variety," Table 2 shows returned entities "amisco, cornifesto, tinta carvalha, espadeiro, tinta barroca, tinta francisca," which are Portuguese varietals. The illustrated results are a reflection of the Portuguese varietals being present in many exclusive tables. However, again this is not a complete list of the results, and other varietals are found in the complete list.

TABLE 2

| Concept | Seed entities | Returned entities |
|---|---|---|
| adverse side effect | addiction, depression | Headache, nausea, diarrhea, insomnia, dizziness, constipation . . . |
| grape variety | nebbiolo, barbera | ramisco, cornifesto, tinta carvalha, espadeiro, tinta barroca, tinta francisca . . . |

In the following examples, tables 1-6, designated $t_1$ to $t_6$, represent tables returned by a search system, such as WTS, for the concept "database software." The text immediately above the tables represent the caption, surrounding text, or nearest heading containing one or more words from the received concept.

TABLE $t_1$

Operating systems support for top database software

| Name | Windows | Linux |
|---|---|---|
| Oracle | Yes | Yes |
| MySQL | Yes | Yes |
| SQL Server | Yes | No |
| PostgreSQL | Yes | Yes |

TABLE $t_2$

List of open source database software

| Name | License |
|---|---|
| MySQL | GPL |
| PostgreSQL | PostgreSQL |
| Firebird | IPL |
| Berkeley DB | AGPLv3 |

TABLE $t_3$

Database software, 2011 revenue by vendor

| Vendor | Revenue |
|---|---|
| Oracle | 11787M |
| IBM | 4870M |
| Microsoft | 4098M |
| Teradata | 882M |

TABLE $t_4$

Best-selling books on database software

| Book | Price |
|---|---|
| Teach SQL in 10 Minutes | 20.03 |
| SQL Server for Developers | 38.13 |
| Access 2013 Bible | 32.17 |

TABLE $t_5$

Information about database size limits

| Name | Maximum Row Size |
|---|---|
| MySQL | 64 KB |
| Oracle | 8 KB |
| Firebird | 64 KB |

TABLE $t_6$

Best-selling software in 2010

| Name | Developer |
|---|---|
| Oracle | Oracle |
| SQL Server | Microsoft |
| Office | Microsoft |
| Photoshop | Adobe |

Still in the expansion portion 404, as illustrated at 412, one or a number of computing devices, such as device(s) 106 of distributed computing resources 102, can rank results of the keyword search of a search system, such as WTS using the concept. For example, ranking module 222 of device 200 can rank the tables identified from the expansion module 220 posing the concept or concept name from receiver module 218 as a keyword search.

The computing device(s) can identify a set of distinct entities among the entity mentions in the subject columns of the input tables. The computing device(s) can also identify the seed entities among those distinct entities. Various approaches can be used for entity resolution. In one non-limiting example, the computing device(s) can identify the distinct entities by grouping the entity mentions in the subject columns using a string matching process. The computing device(s) can identify the seed entities amongst the distinct entities in the web tables using the same or another string matching process.

In the example shown, the retrieved tables are produced at 414 ranked according to occurrence of the keywords of the concept found in column headers, captions, surrounding text, etc. as shown in italicized text. The ranking order of the example tables is $t_1, t_2, t_3, t_4, t_5, t_6$. In this example, $t_1, t_2, t_3$, and $t_4$ are ranked higher as they match both words of the concept whereas $t_5$ and $t_6$ are ranked lower as they each only match one of the words of the concept.

In the example shown, the retrieved tables have a subject column, which contains the set of entities that the table is about. Meanwhile, the other columns represent binary relations or attributes of those entities. Although in the example shown, the left-most column represents the subject column, any suitable technique can be used to identify the subject column without regard to the location of the subject column in the table. In several example implementations, the computing device(s) 106 can employ an approach similar to that described in "Recovering Semantics of Tables on the Web," Venetis et al., Proceedings of the Very Large Data Bases Endowment (PVLDB), 2011, v. 4, pp. 528-538, and "Understanding Tables on the Web," Wang et al., International Conference on Conceptual Modeling, 2012, Florence, Italy, which are incorporated herein by reference.

Also in the expansion portion 404, as illustrated at 416, one or a number of computing devices, such as device(s) 106 of distributed computing resources 102 can receive the retrieved tables ranked from 414 as well as one or more seed entities 410. For example, receiver module 218 of device 200 can receive the retrieved tables and one or more seed entities. In some examples, receiver module 218 can receive the seed entities from communications module 320 of device 300 and receiver module 218 can receive the retrieved tables from ranking module 222. In various example, communications module 320 can have received the seed entities from input module 318. In some examples, graphing module 224 of device 200 can receive he retrieved tables from ranking module 222 and/or the one or more seed entities from communications module 320 of device 300. Such examples are not exclusive.

At 416, the graphing module 224 can use the retrieved tables ranked from 414 as well as one or more seed entities 410 to build a graph of the retrieved tables and the entities in them. The graph can be passed from graphing module 224 to output module 226, which can in turn cause the graph to be generated for presentation in a user interface of I/O interface(s) 210 of device 200 or passed to a communications module such as communications module 320 for output module 322 to cause presentation via I/O interface(s) 310. The graph can be a bipartite graph, such as the example bipartite graph shown in FIG. 5.

Figure 5:
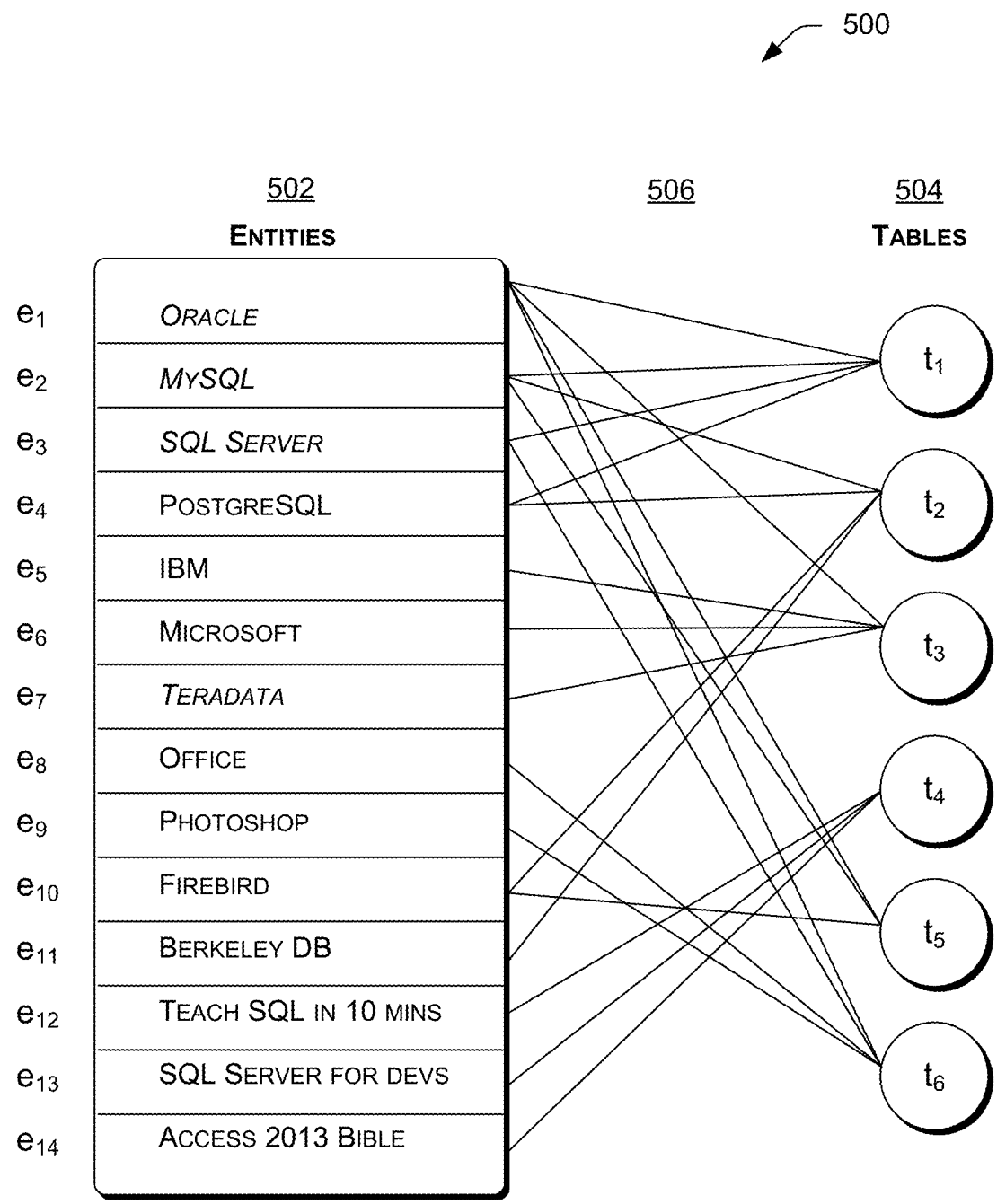
FIG. 5 is a content expansion bipartite graph of entities and tables according to an example scenario.

FIG. 5 at 500 illustrates an example entity-table bipartite graph according to one non-limiting example scenario based on FIG. 4. The example bipartite graph 500 includes the set of distinct entities 502 (with the seed entities italicized) and the set of tables 504 returned by a search system such as WTS. Edges are shown at 506. An edge between an entity and a table indicates that the entity is mentioned in the subject column of the table. The computing devices can perform graph-based ranking, such as generalized Co-HITS, or another graph-based ranking method. Such graph-based ranking can use prior knowledge of the entities and the tables as well as a link structure. However, traditional ranking methods may fail tail concept expansion due to the abundance of non-exclusive tables.

As used herein, an entity that belongs to the concept is relevant and entities that do not belong to the concept are irrelevant. A search system such as WTS returns two types of tables. Exclusive tables are tables that exclusively contain relevant entities in their subject column. In one non-limiting example scenario illustrated for convenience, $t_1, t_2$, and $t_5$ are examples of exclusive tables in the example scenario. In the example scenario, non-exclusive tables, which do not exclusively contain relevant entities in their subject column; $t_3, t_4$, and $t_6$ are examples of non-exclusive tables. In the illustrated example, let $T(e_i)=\{t_j \ni e_i\}$ be the set of tables that are linked to $e_i$. $T(e_i)$ can be referred to as the support table set, and $|T(e_i)|$ can be referred to as the support of $e_i$. For example, $T(e_1)=\{t_1,t_3,t_5,t_6\}$.

As noted above, FIG. 5 is an example entity-table bipartite graph according to the non-limiting example scenario. In this example the seed entities are shown in italics. A generalized Co-HITS algorithm ranks entities and tables in the following order: Oracle, MySQL, SQL Server, Teradata, PostgreSQL, Firebird, Microsoft, IBM, Photoshop, Office, Berkeley DB, Teach SQL in 10 Minutes, SQL Server for Developers, Access 2013 Bible; $t_3, t_1, t_6, t_2, t_5, t_4$.

Note that when using generalized Co-HITS, entities that are irrelevant to the concept, such as Microsoft, IBM, Photoshop and Office are ranked above a relevant entity, Berkeley DB. Non-exclusive tables cause existing random-walk ranking algorithms to fail due to semantic drift. Large non-exclusive tables about overlapping concepts (e.g., $t_6$) can accumulate high scores. Thus, entities that are irrelevant to the concept and popular in such non-exclusive tables will receive higher scores than relevant but less popular entities, such as Berkeley DB. These relevant but less popular entities are often desirable for the application of concept expansion, since popular entities have a high chance to exist in a knowledgebase already. This analysis can apply to any graph-based ranking methods that linearly aggregate scores from all neighboring vertices.

Returning to FIG. 4, also in the expansion portion 404, as illustrated at 418, one or a number of computing devices, such as device(s) 106 of distributed computing resources 102, can model the exclusivity of tables. For example, expansion module 220 of device 200 can model the exclusivity of tables. By using only exclusive tables to find relevant entities the concept expansion framework vastly boosts precision, without substantial loss of recall because: (i) it is common to retrieve from the search system such as WTS a large number of exclusive web tables for a tail concept such as tables $t_1, t_2$, and $t_5$ in FIG. 5; and (ii) most relevant entities appear in exclusive tables.

To infer exclusive tables and find relevant entities, concept expansion using tables as described herein, e.g., via expansion module 220, identifies a special entity-table relationship: a table is exclusive if and only if all of the entities in the table are relevant, and an entity is relevant if it appears in at least one exclusive table.

Concept expansion using tables as described herein, e.g., via ranking module 222, includes a probabilistic model that holistically ranks entities and tables. At least one suitable ranking method can model the score of a table as 'how likely the entire table is exclusive' instead of 'the fraction of the table that is relevant,' and can respect the asymmetric entity-table relationship. That is, an exclusive table will contain only relevant entities while a relevant entity can appear in non-exclusive tables. The score from table to entity and entity to table is propagated in asymmetrically, and aggregated nonlinearly to emulate taking 'all or none' from exclusive or nonexclusive tables. Applying the method described herein, an entity can be identified as relevant even if it is infrequent in candidate exclusive tables, as long as it appears in at least one exclusive table. Such an entity will have a reasonable score using the probabilistic ranking model and be found relevant. Meanwhile, if an entity is infrequent in any tables that include any relevant entities, the described system can make a negative inference regarding the possibility that the entity may be relevant. That is, an entity that is infrequently represented in any tables that include any relevant entities is unlikely to be relevant.

Still in the expansion portion 404, as illustrated at 418, one or a number of computing devices, such as device(s) 106 of distributed computing resources 102, can rank relevant entities and exclusive tables. For example, ranking module 222 of device 200 can receive a graph of relevant entities and exclusive tables from graphing module 224.

In the illustrated example, the input to 418 can be the bipartite graph output by 416, with seed entities and search system table ranking included. In some examples, ranking module 222 can rank the entities and tables.

In the output portion 406, as illustrated at 420, one or a number of computing devices, such as device(s) 106 of distributed computing resources 102, can produce a ranked list of entities and web tables. For example, output module 226 of device 200 can receive results from ranking module 222 for output.

The ranked list of entities and tables can be passed from ranking module 224 to output module 226, which can in turn cause the results to be generated for presentation in a user interface of I/O interface(s) 210 of device 200 or passed to a communications module such as communications module 320 for output module 322 to cause presentation via I/O interface(s) 310.

The output can include a ranked list of entities according to their exclusivity. The concept expansion framework 216 performs ranking for both entities and tables because they are highly interdependent. The ranked list of tables can also complement the ranked list of entities and facilitate the investigation. Furthermore, the tables provide opportunities of adding relational attributes to the knowledgebase or spreadsheets, which is an important goal of knowledgebase expansion and ad-hoc list creation. A formal definition for ranking can include the following Definition 1.

Definition 1: Given a concept C, ordered web tables $T=\{t_j\}_{j=1}^m$ that cover entities $E=\{e_i\}_{i=1}^n$, and a seed entity $S \subset E$, rank these entities with score $\{x_i\}_{j=1}^n$, and the table with score $\{x_j\}_{j=1}^n$, according to entities' relevance and tables exclusivity, e.g., whether $e_i \in C$ and $t_j \in C$.

The described probabilistic model can apply the following principles for entity and table ranking in the concept expansion framework 216. The principles leverage the interdependency of finding relevant entities and finding exclusive tables.

Principle 1: A table $t_j$ is exclusive if and only if all the entities $e_i \in t_j$ are relevant.

Principle 2: An entity $e_i$ is relevant if it appears in at least one table $t_j$ such that $t_j$ is exclusive.

Principle 2 is a corollary of Principle 1. That is, an exclusive table must contain only relevant entities, but a relevant entity can appear in non-exclusive tables.

Given either a complete set of relevant entities or a complete set of exclusive tables, concept expansion using tables can leverage the two principles to obtain the other set. For example, given knowledge of the entities belonging to the concept C, concept expansion using tables can deduce which tables belong to concept C using Principle 1. Conversely, concept expansion using tables can deduce which entities belong to concept C using principle 2 when the knowledge of the tables belonging to the concept C is given.

It is possible to have false negatives when applying principle 2 given knowledge of the tables belonging to the concept C because some relevant entities may only appear in non-exclusive tables. However, given a large sample size of tables and the performance of a search system such as WTS, the omissions will be rare.

In some examples, the input can provide partial prior information for entities and tables. If $e_i \in S$ is a seed entity, the concept expansion using tables framework has strong prior knowledge for e to belong to the concept C. If a table $t_j$ is ranked high by the search system such as WTS (that is j is small), the concept expansion using tables framework has weak prior knowledge for $t_j$ to belong to concept C. The table prior is weak because the search system does not rank tables according to their exclusivity. The concept expansion using tables framework can only assume that the search system ranking is overall positively correlated with the exclusivity.

With the unavoidable uncertainty, the concept expansion using tables framework models the problem as a holistic entity and table ranking task that incorporates soft counterparts of the above principles.

An example probabilistic ranking model can be described as follows. Let $x_i = p(e_i \in C) \in (0,1]$ denote the likelihood of entity $e_i$ belonging to concept C, and $y_j = p(t_j \subset C) \in [0,1]$ denote the likelihood of table $t_j$ belonging to concept C. Let $x_i > 0$ because the framework cannot assert an entity does not belong to concept C with certainty absent negative evidence. The framework for concept expansion using tables can then model the seed entity/table relationship with soft counterparts of Principle 1 and 2. According to Principle 1, the framework can model each $y_j$ as an aggregation function $f_{E \to T}$ of $x_i$, $e_i \in t_j$. According to Principle 2, the framework can model each $x_i$ as an aggregation function $f_{T \to E}$ of $y_j$, $t_j \in e_i$. Then, the framework can solve the following equations (1) to perform holistic entity and table ranking.

$$x_i = f_{T \to E}(\{y_j, t_j \in e_i\})$$

$$y_j = f_{E \to T}(x_i, e_i \in t_j) \quad (1)$$

In some examples, one or more modules of concept expansion framework 216, such as expansion module 220, ranking module 222, and/or graphing module 224 can incorporate prior knowledge of entities and tables by adding pseudo tables and entities in the bipartite graph, such as graph 500.

As discussed above, symmetric, linear aggregation functions, like the random walk employed by PageRank, Co-HITS, etc. suffer from the semantic drift. The reason is that they do not consider the special relationship we are modeling between relevant entities and exclusive tables according to Principle 1 and 2. The following section discusses example design principles for two aggregation functions $f_{E \to T}$ and $f_{T \to E}$, both of which should produce values between 0 and 1.

An example entity to table aggregation function can be described as follows. A soft counterpart of the relationship expressed in Principle 1 is: given $x_i$ for $e_i \in E$, the concept expansion framework 216 can model $y_j = p$ ($t_j \subset C$) as an aggregation function $f_{E \to T}$ of $\{x_i | e_i \in t_j\}$.

Principle 1 suggests that as long as one entity $e_i \in t_j$ is not in concept C, the whole table $t_j$ is not in concept C. In the probabilistic model, $f_{E \to T}$ can reflect a likelihood that all of the entities in $t_j$ belong to C. It produces a low value if any $x_i | e_i \in t_j$ is low. Also, it can distinguish tables that have small differences. Two axiomatic properties follow:

1. Consider a table $t_j$. For any entity $e_i \in t_j$, its likelihood of belonging to C is an explanatory variable of the likelihood $t_j$ belonging to C. When it is almost certain that the entity $e_i$ does not belong to C, the table $t_j$ is also almost certain to be nonexclusive. In contrast, if all the entities in $t_j$ are certain to be relevant, the table $t_j$ is also certain to be exclusive.

Property 1 (Asymptotic Principle 1). $\forall e_i \in t_j$, $\lim_{x_i \to 0} y_j = 0$;
Let $x = [x_i | e_i \in t_j], y_j = 1$ if $f$ $x = 1$.

2. If two tables $t_a$ and $t_b$ are identical except two entities with equal support, the table containing the entity with a higher likelihood should have a higher likelihood of belonging to the concept (unless the likelihood for both is equal to zero).

Property 2 (Monotonicity). If $t_a = t \cup \{e_1\}$, $t_b = t \cup \{e_2\}$, $|T(e_1)| = |T(e_2)|$ and $x_1 < x_2$, then $0 \leq y_a \leq y_b \leq 1$ ($y_a = y_b$ happens only when $y_b = 0$).

As one example, the minimum value from $\{x_i | e_i \in t_j\}$, e.g., $$f_{E \to T}(\{x_i | e_i \in t_j\}) = \min_{e_i \in t_j} x_i \quad (2)$$

satisfies Property 1, but not Property 2. It is determined by a single element $x^*$ in the set $\{x_i | e_i \in t_j\}$ and insensitive to other elements as long as they are not smaller than $x^*$.

Example 2

Consider the two tables $t_1$ and $t_3$ in FIG. 1. $t_1$ contains 4 entities $e_1$=Oracle, $e_2$=MySQL, $e_3$=SQL Server and $e_4$=PostgreSQL, and $t_3$ contains 4 entities $e_1$=Oracle, $e_5$=IBM, $e_6$=Microsoft and $e_7$=Teradata. Suppose $x_1 = x_2 = x_3 = 0.9$, $x_4 = x_5 = x_6 = x_7 = 0.1$. Then Equation (2) produces identical $y_j$ value for these two tables. But $t_1$ should be deemed more likely to belong to C than $t_3$ as $t_1$ has more relevant entities.

As another example, the random walk aggregation function, i.e., violates Property 1.

$$f_{E \to T}(\{x_i | e_i \in t_j\}) = \sum_{e_i \in t_j} \frac{x_i}{|T(e_i)|} \quad (3)$$

An example table to entity aggregation function can be described as follows. Given $y_j$ for $t_j \in T$, concept expansion framework 216 can model $x_i = p(e_i \in C)$ as an aggregation function $f_{T \to E}$ of $\{y_j | t_j \ni e_i\}$, which represents a soft counterpart of the relationship expressed in Principle 2.

Principle 2 suggests that if an entity appears in one exclusive table, it is relevant. In the probabilistic model, $f_{T \to E}$ can reflect the likelihood that at least one table $t_j \ni e_i$ in the support set of $e_i$ belongs to C. It can also produce a high value if any $y_j(t_j \ni e_i)$ is high, and it can distinguish entities that have slightly different support table sets. Two axiomatic properties follow:

1. Consider an entity $e_i$ and table $t_j$. When the table $t_j$ is certain to belong to C, the entity $e_i$ is also certain to belong to C.

Property 3 (Principle 2). $x_i = 1$ if $\exists t_j \ni e_i$, $y_j = 1$.

Note that Property 3 is unlike Property 1 in two respects: (i) the limit ($\lim_{y_j \to 0} x_i = 0$) is not true, because relevant entities can occur in non-exclusive tables; and (ii) $x_i = 1$ if but not only if $\exists t_j \ni e_i$, $y_j = 1$, for the same reason.

2. If the support table sets of two entities $e_a$ and $e_b$ are identical except two equal sized tables, the entity contained in the table with a higher likelihood should have a higher likelihood of belonging to the concept (unless the likelihood for both is 1).

Property 4 (Monotonicity). If $T(e_a) = T_0 \cup \{t_1\}$, $T(e_b) = T_0 \cup \{t_2\}$,
$|t_1| = |t_2|$ and $y_1 < y_2$, then $0 < x_a \leq x_b \leq 1$ ($x_a = x_b$ only when $x_a = 1$).

As one example, the maximum value from $\{y_j | t_j \ni e_i\}$, e.g., $$f_{E \to T}(\{y_j | t_j \ni e_i\}) = \max_{t_j \ni e_i} y_j \quad (4)$$

satisfies Property 3, but violates Property 4.

As another example, the random walk aggregation function, i.e., $$f_{T \to E}(\{y_j | t_j \ni e_i\}) = \sum_{e_i \in t_j} \frac{y_j}{|t_j|} \quad (5)$$

violates Property 3.

An example ranking algorithm can be described as follows. Based on the ranking model, concept expansion framework 216 can apply an algorithm to perform joint inference for entity likelihood $x_i$ and table likelihood $y_j$.

One approach is to find a solution that satisfies Equation (1), by iteratively applying the aggregation functions in Equation (1). This approach may fail to rank the relevant entities and exclusive tables ahead of irrelevant and non-exclusive ones when the following are both true: (i) there are a large number of tables in a bipartite graph that belong to a different concept C'; and (ii) these tables contain a similar set of entities. For example, in Tables $t_1$ to $t_6$, if there are many tables like $t_4$, the entities and tables about database books can amass high scores from each other. Thus, in various examples, to address this issue, concept expansion framework 216 can apply an algorithm, such as the algorithm called CONCEPTEXPAND presented in FIG. 6.

The CONCEPTEXPAND algorithm shown in FIG. 6 can perform restricted propagation on a subset of entities and tables, instead of propagating scores among all entities and tables. CONCEPTEXPAND can be considered a two-phase algorithm.

In the first phase, one or more modules of concept expansion framework 216, such as expansion module 220, can identify a subset of entities and tables for restricted propagation; begin with the seed entities, which are most likely to be relevant. One or more modules of concept expansion framework 216, such as expansion module 220, can then expand the set by iteratively adding the most plausible tables based on current estimation. One or more modules of concept expansion framework 216, such as expansion module 220, can stop adding tables when the remaining tables all have low estimated likelihood of belonging to C. And, one or more modules of concept expansion framework 216, such as expansion module 220, can collect entities with enough support, and remove tables with few entities in this collection.

In the second phase, one or more modules of concept expansion framework 216, such as expansion module 220, can perform iterative propagation within this set. The two-staged method prevents adding too many irrelevant tables all at once and impairing score propagation. During the first phase, only high-confidence tables contribute to entities' likelihood computation. And, the second phase can refine the earlier estimation, which was based on incomplete information.

As the starting point of the probabilistic reasoning, the score for the seed entities can be set according to the prior knowledge (e.g., they are very likely to be in C). For other entities, $x_i$ is unknown, and they will not be computed until a table containing them is added to the reasoning set. To compute the score for a table $t_j$ with missing entity score, one or more modules of concept expansion framework 216, such as expansion module 220, can use the table prior $\pi_j$ to replace the missing entities' score and feed to the aggregation function $f_{E \to T}$. The more knowledge one or more modules of concept expansion framework 216, such as expansion module 220, has of entities in a table, the less important the table prior is.

FIG. 6 illustrates pseudocode for an example CONCEPTEXPAND algorithm. In the example of FIG. 6, Lines 4-14 identify the table set and entity set for reasoning, by adding the most plausible table one by one, updating the estimation of both tables and entities, and removing the ones with low support. When adding a table, one or more modules of concept expansion framework 216, such as expansion module 220, identifies that the table contains some entity in the reasoning set (Line 6). This reduces the chance of adding a table simply because it has high prior. When removing tables and entities, one or more modules of concept expansion framework 216, such as expansion module 220, can repeat checking if any entity has no more than one support table (Line 13), and if any table has more than half of entities missing in the reasoning set (Line 12). In lines 15-17 one or more modules of concept expansion framework 216, such as expansion module 220, can solve the equations within the reasoning set, using a fixed-point iteration.

One or more modules of concept expansion framework 216, such as expansion module 220, can set the parameter $\alpha$ according to the precision-recall requirement. Lower $\alpha$ leads to higher recall but lower precision in general. When $\alpha=0$, all the tables will be added to the reasoning set. $\alpha=1$ filters out all tables. In general, one or more modules of concept expansion framework 216, such as expansion module 220, can set $\alpha$ automatically according to table prior scores $\{\pi_j\}$ (e.g., the median of $\{\pi_j\}$).

The CONCEPTEXPAND algorithm has a complexity O(mL), where m is the number of tables and L the total size of tables (e.g., the number of links in a table-entity bipartite graph, such as graph 500).

Given that the CONCEPTEXPAND algorithm requires iterative computation of $y_j$ and $x_i$, a desirable property of the computation is that it converges after a limited number of iterations. The following, provides a condition for aggregation functions $f_{E \to T}$ and $f_{T \to E}$, which is one example that guarantees convergence.

Property 5 (Diminishing Return). Let $x=[x_1, x_2, \ldots, x_n]$ be an n-dimensional vector with entity score $x_i$ as components. Let g(x) be the entity score after one iteration of updates using $f_{E \to T}$ and $f_{T \to E}$. The aggregation generates diminishing return if (i) there exists a compact set $D \in [0,1]^n$ such that $g(D) \subseteq D$, and (ii) $\forall x,z \in D(x \neq z), \max_{i \in [n]}|x_i - z_i| > \max_{i \in [n]}|g(x)_i - g(z)_i|$. D is called the diminishing region of g.

The first part of Property 5 states that the aggregation has to produce proper probabilities in a compact region in $[0,1]^n$ if inputs are proper probabilities in the same region. The compact region can be $[0,1]^n$ itself, or a subset of it. This provides for outputting probabilities, and in some cases regularizing the probabilities. For example, random walk requires the probabilities to be within a simplex $\Sigma_{i=1}^n x_i = 1$.

The second part of the property states that the maximum difference of probability for the same entity in x and z diminishes after one iteration of $f_{E \to T}$ and $f_{T \to E}$. In particular, when one or more modules of concept expansion framework 216, such as expansion module 220, boosts the initial belief of one entity by $\delta$, the new belief will increase by less than $\delta$ after one iteration. This means that the initial boost will be "averaged out" by other entities and tables after iterative propagations. The change of inferred confidence should not surpass the change of original confidence.

One or more modules of concept expansion framework 216, such as expansion module 220, can in fact show that the condition holds in many common aggregation functions, when prior knowledge is incorporated as pseudo entities and pseudo tables. One example is to use arithmetic mean as aggregation functions for both $f_{E \to T}$ and $f_{T \to E}$, and add a pseudo entity with likelihood $\pi_j$ to table $t_j$ as prior knowledge (e.g., based on the ranking position in the search system such as WTS).

Proposition 1. Let $$f_{E \to T}(\{x_i \mid e_i \in t_j\}) = \frac{\pi_j + \sum_{e_i \in t_j} x_i}{|t_j| + 1}, \text{ and}$$

$$f_{T \to E}(\{y_i \mid t_j \ni e_i\}) = \frac{\Sigma_{t_j \ni e_i} y_j}{|T(e_i)|},$$

i.e., both $f_{E \to T}$ and $f_{T \to E}$ are arithmetic mean, then the aggregation generates diminishing return in [0, 1].

There are other combinations of common aggregation functions that also enjoy Property 5, e.g., the random walk aggregation functions as in Equations (3) and (5). Property 5 guarantees convergence.

Theorem 1. If aggregation functions satisfy Property 5 with diminishing region D, then Algorithm 1 converges to the unique solution to Equation (1) in D, with initial $x \in D$.

To prove Theorem 1, one or more modules of concept expansion framework 216, such as expansion module 220, can view g(x) as a composite function from $f_{E \to T}$ and $f_{T \to E}$, and apply a theorem such as Banach's Fixed Point theorem to ensure that a unique solution can be found for the system of Equation (1) using iterative computation.

Theorem 1 employs fairly simple properties to guarantee the convergence of the example CONCEPTEXPAND algorithm. Proposition 1 implies that common aggregation functions, such as smoothed arithmetic mean, guarantees convergence. Therefore, the concept expansion framework is flexible—any reasonable aggregation functions satisfying the required properties can be used in Equation (1) to model a particular application, and the example CONCEPTEXPAND algorithm can converge to the solution.

Turning to several example choices of aggregation functions and prior knowledge encoding, which are functions that one or more modules of concept expansion framework 216 can use for the example CONCEPTEXPAND algorithm.

These functions can be tailored specifically for the example tail-concept problem. At the end of this section we will also present a running example.

Entity to table aggregation. As discussed in above, one or more modules of concept expansion framework 216 can identify a function $f_{E \to T}:[0,1]^n \to [0,1]$ that satisfies the desirable Properties 1 and 2.

Property 2 (monotonicity) requires the function to be responsive to the change of every input element positively. Property 1 (asymptotic Principle 1) requires the function to approach 0 when any input element approaches 0, and to approach 1 when all input elements approach 1. The three Pythagorean means, arithmetic mean, geometric mean, and harmonic mean satisfy the monotonicity, and the latter two satisfy Principle 1 asymptotically.

Between these two, one or more modules of concept expansion framework 216 may choose the one that fits Principle 1 most closely since the table ranking score reflects whether all entities in the subject column of a table are within the concept.

One or more modules of concept expansion framework 216 may prefer the score to be low even when there are only a small number of irrelevant entities in the table. Since the harmonic mean of a list of numbers tends strongly toward the least elements of the list, it tends (compared with the arithmetic and geometric mean) to mitigate the impact of large numbers (relevant entities) and magnify the impact of small ones (irrelevant entities). As such, one or more modules of concept expansion framework 216 may choose the harmonic mean as the aggregation function:

$$f_{E \to T}(\{x_i \mid e_i \in t_j\}) = \frac{|t_j|}{\sum_{e_i \in t_j} \frac{1}{x_i}} \quad (6)$$

Table to entity aggregation. As discussed above, one or more modules of concept expansion framework 216 can employ a function $f_{E \to T}:[0,1]^n \to [0,1]$ that satisfies the desirable Properties 3 and 4.

Property 4 (monotonicity) requires the function to be responsive to the change of every input element positively. Property 3 (Principle 2) requires the function to approach 1 when any input element approaches 1. The three Pythagorean means satisfy the monotonicity, but none of them satisfy Principle 2. One or more modules of concept expansion framework 216 can derive a meaningful aggregation function from the probabilistic meaning of the score. If one or more modules of concept expansion framework 216 assume the events '$t_j \subset C$' are independent for tables $t_j \in T(e_i)$ in the support set of $e_i$, the one or more modules of concept expansion framework 216 can use the 'noisy-or' model for table-to-entity score aggregation: $e_i \not\subset C$ only if none of its support tables belong to C.

$$f_{T \to E}(\{y_i \mid t_j \ni e_i\}) = p(V_{t_j \ni e_i} t_j \subset C) = 1 - \Pi_{t_j \ni e_i} p(t_j \subset C) = 1 - \Pi_{t_j \ni e_i}(1 - y_j) \quad (7)$$

This model can accumulate weak evidence quickly to produce false positives, as illustrated by the following example.

Example 3

Consider two entities from FIG. 5, Office and Berkeley DB. Berkeley DB appears in one table $t_2$, with $y_2 = 0.9$. Suppose there are 6 other tables identical to $t_6$ (say, $t_7, \ldots, t_{12}$) and they all contain Office. Suppose $y_6 = \ldots = y_{12} = 0.3$. This is realistic because tables about popular yet non-target concepts (e.g., general software in this case) can dominate the results from the search system such as WTS. Equation (7) produces higher likelihood for Office than for Berkeley DB (0:92 vs 0:9) which is undesirable. Note that there is no table that strongly supports Office to be relevant; on the contrary, there is a table ($t_2$) that strongly supports Berkeley DB to be relevant.

A similar issue has been discussed by others, e.g., Downey et al., in a different scenario. They addressed the problem that when an entity is involved in a pattern for multiple times, the 'noisy-or' model will accumulate weak evidence. They proposed an Urn model for repetitive sampling of entities that allows replacement. In the illustrated example, each entity appears once in each table, so an Urn model for repetitive sampling of entities that allows replacement does not apply.

Concept expansion using tables as described herein applies a new heuristic solution. Given the collection of $\{y_j | t_j \ni e_i\}$, a few large values in it should contribute more to the aggregated value $x_i$ than many small values. Based on that information, one or more modules of concept expansion framework 216 can sort the $y_j$'s in a descending order $y_{j_1} \geq y_{j_2} \geq \ldots$, and assign a decreasing series of weights $1 \geq w_1 > w_2 > \ldots$ to them.

$$f_{T \to E}(\{y_i \mid t_j \ni e_i\}) = 1 - \prod_{t_{j_u} \ni e_i, y_{j_u} \geq y_{j_{u+1}}} (1 - y_{j_u})^{w_u} \quad (8)$$

Thus, the small values in $\{y_j | t_j \in T(e_i)\}$ have relatively small contribution to $x_i$. In other words, the number of support tables of e has a diminishing marginal utility. The more support tables that are observed, the less important those small values are. When $w_i$'s are all equal to 1, this function reduces to the 'noisy-or' model. To determine $w_i$, one or more modules of concept expansion framework 216 introduces a notion of effective support. For brevity, assume an entity appears in m tables with equal likelihood q. Then Equation (8) becomes: $f_{T \to E}(\{y_i | t_j \ni e_i\}) = 1 - (1-q)^{\sum_{i=1}^{m} w_i}$. Call $\sum_{i=1}^{m} w_i$ the effective support of $x_i$. In the 'noisy-or' model, the effective support is equal to the actual support m. By assigning the decaying weight $1 \geq w_1 > w_2 > \ldots$, the effective support can grow sublinearly with m. Consider the question, how slowly the effective support should grow with respect to m? A fast growing example is $$\Theta\left(m^{\frac{m-1}{m}}\right),$$

which is close to linear when m is large. A extremely slow growing example is $\Theta(\ln(m))$, which almost does not grow in our scale with thousands of tables. A medium example is $\Theta(\sqrt{m})$, where support 100 is converted to effective support 10. In general, one or more modules of concept expansion framework 216 can set $$w_i = \frac{1}{i^p},$$

$0 < p < 1$, to obtain an asymptotic growth rate $\Theta(m^{1-p})$ of effective support (p=0 and p=1 correspond to linear and logarithmic growth respectively). The sequence $\{w_i\}$ in this case can be referred to as a p-series. For example, one or more modules of concept expansion framework 216 can use the ½-series as the decaying weight $w_i$, which can resolve the issue in Example 3 to a large extent: the undesirable accumulation is much slower, with a square root growth rate of effective support.

Proposition 2. The rectified 'noisy-or' function with decaying weight, as in Equation (8), satisfies both Property 3 and 4. The proof is omitted for the sake of brevity.

As noted above, in some examples, concept expansion framework 216 can incorporate prior knowledge of entities and tables by adding pseudo tables and entities in a bipartite graph, such as graph 500. By adding pseudo entities or tables one or more modules of concept expansion framework 216, such as expansion module 220 can incorporate prior knowledge for the task of concept expansion.

Prior on entity side: For seed entities, concept expansion framework 216 can have strong prior knowledge that the seed entities belong to concept C. In at least one example, concept expansion framework 216 can add one pseudo table for each seed entity $e_i \in S$ and link the pseudo table to the corresponding entity. The table has a fixed confidence score $1-\in_i$, where $\in_i$ is a small error rate depending on the source of the entities. If the entities are provided by human curators, $\in_i$ should reflect the error rate of the curators which is typically very low. If the entities come from a non-curated database such as web-extracted concept-entity pairs, $\in_i$ should be set according to the precision of the database. Furthermore, the different seed entities may have different confidence of belonging to concept C. For example, in Probase, an entity $e_i$ has an integer support $s_i$ about its occurrence with C. The larger $s_i$ is, the more confident it is to be a correct seed entity for C. So we can set $\in_i = \in_C^{s_i}$, where $\in_C$ is a small constant like 0.1.

Prior on table side: All search systems such as WTS return a ranked list of tables for a query. Concept expansion framework 216 can assume the relevance of a table to the concept C degrades with the tables' position in the ranked list returned by a search systems such as WTS. Therefore, the prior estimation of the likelihood of a top ranked table belonging to C is higher than that of a lower ranked table. Since concept expansion framework 216 can retrieve a constant number of tables from the search system such as WTS, concept expansion framework 216 may retrieve tables that are partial matches to the concept name (like table $t_6$ in FIG. 1). To account for that, concept expansion framework 216 can penalize tables that do not match all the tokens in the concept name. In various examples, concept expansion framework 216 can define the table prior $\pi_j$ as:

$$\pi_j = \left(\frac{1}{2}\right)^{\#missing\ tokens\ of\ C\ in\ t_j} \frac{1}{j+1} \quad (9)$$

Recall that j is the rank position of table $t_j$. When a table contains all tokens in C, its prior is $$\frac{1}{j+1},$$

which decays fast as the ranking position increases. Otherwise, its prior is penalized exponentially with respect to the number of missing tokens. Concept expansion framework 216 can incorporate the prior by adding a pseudo entity with confidence $\pi_j$ to link to each table $t_j$. In this way, the prior is just one value that participates in the aggregation function $f_{E \to T}$. More knowledge of entities in a table can lead to less reliance on the table prior.

Concept expansion framework 216 can use the described treatment that is flexible and easy to compute. The imperfect but reasonable prior score demonstrates the ability of concept expansion framework 216 of handling noise. More sophisticated prior scores are contemplated and may also be used.

The chosen aggregation functions and prior score satisfy the convergence condition in Theorem 1.

Example 4

Consider the example graph 500 in FIG. 5 and discussed above. The prior of tables $t_1$ to $t_6$ are: 0.5, 0.33, 0.25, 0.2, 0.08, 0.07. For ease of calculation concept expansion framework 216 can set $\alpha=0$, $\in_i=0.1$, and skip Line 13 of entity removal from the CONCEPTEXPAND algorithm of FIG. 6 because in larger samples these entities occur more than once.

Initially in the described example, E\U consists of $e_1$=Oracle, $e_2$=MySQL, $e_3$=SQLServer, and $e_7$=Teradata and $T_0=\emptyset$. In the first round, $y_1=0.68$, $y_3=0.35$, $y_5=0.15$, $y_6=0.11$. $t_1$ is selected and added to $T_0$. $x_1$ to $x_4$ are updated: $x_1=0.98$, $x_2=0.972$, $x_3=0.971$, $x_4=0.68$. $e_4$=PostgreSQL is removed from U. In the second round, $t_2$ is selected. $t_3$ is added in round 3, and $t_5$ in round 4. In round 5, $t_6$ is the last table to add into $T_0$, because $t_4$ has no entity in E\U. With that concept expansion can enter the second phase.

After the second phase, the scores converge to a fixed point. The entity scores from high to low are: MySQL (0.992), Oracle (0.991), SQL Server (0.984), Teradata (0.949), PostgreSQL (0.904), Firebird (0.683), Berkeley DB (0.608), IBM (0.495), Microsoft (0.495), Office (0.187), Photoshop (0.187). And the table scores from high to low are: $y_1=0.814$, $y_2=0.608$, $y_3=0.495$, $y_5=0.258$, $y_6=0.187$, $y_4=0$. The entity ranking is desired, while the table ranking has one mistake: $t_5$ is ranked after $t_3$. The main reason is that the table prior plays an important role when the table is small: $\pi_3=0.25 > \pi_5=0.08$. The real table size is typically much larger, and therefore the table prior would not dominate the table ranking as in this described example.

Illustrative Processes

Figure 7:
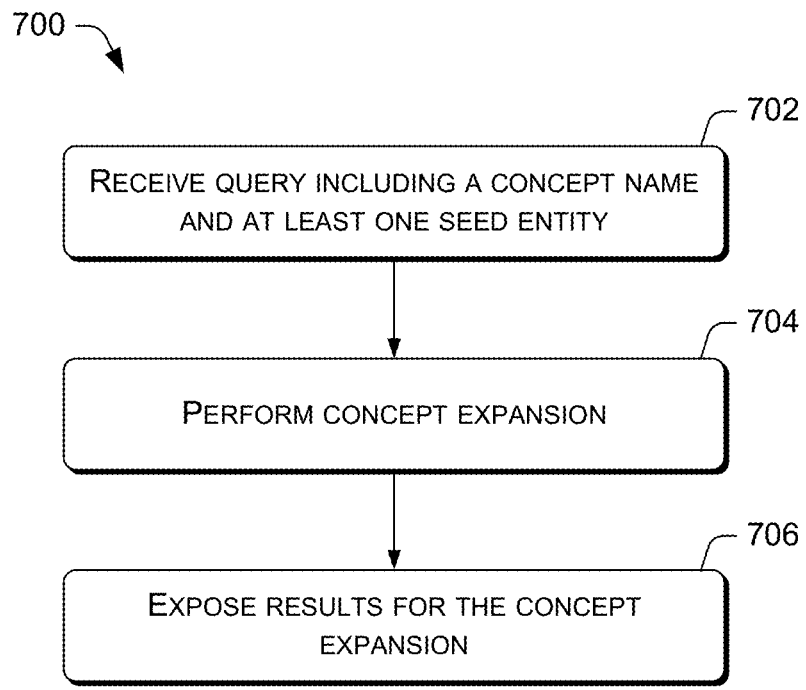
FIG. 7 is a flow diagram that illustrates example processes for concept expansion.
Figure 8:
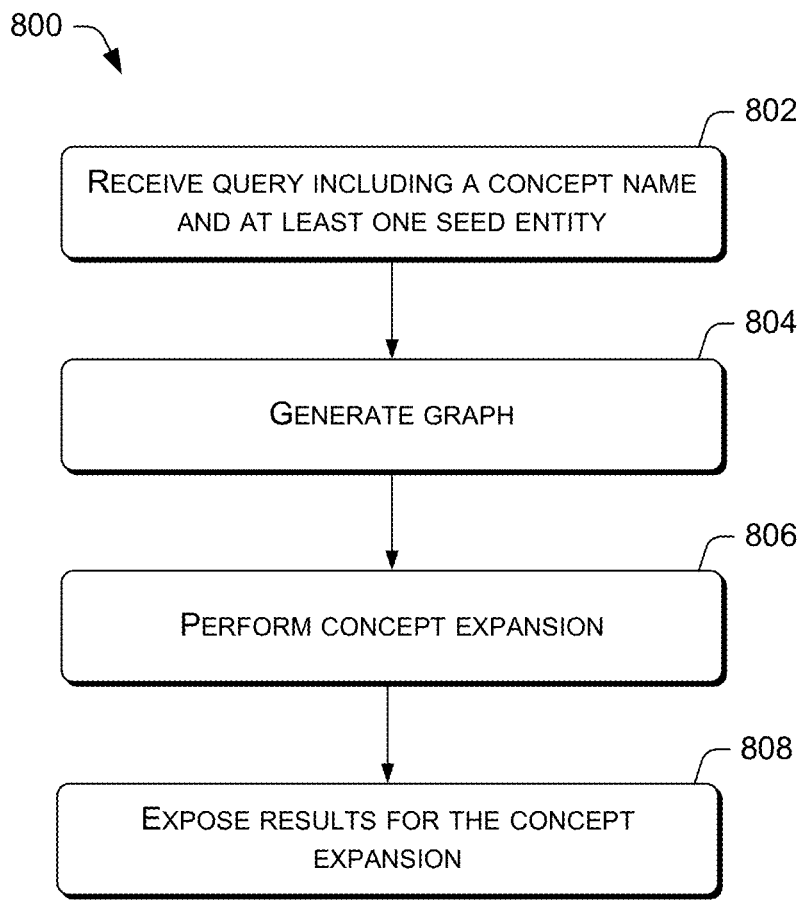
FIG. 8 is a flow diagram that illustrates example processes for concept expansion employing a bipartite graph.

FIGS. 7 and 8 illustrate two example processes associated with concept expansion using tables. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The order in which the operations are described in each example flow diagram or process is not intended to be construed as a limitation, and any number of the described operations can be combined in any order and/or in parallel to implement each process. Moreover, the operations in each of FIGS. 7 and 8 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

The description of the various processes can include certain transitional language and directional language, such as "then," "next," "thereafter," "subsequently," "returning to," "continuing to," "proceeding to," etc. These words, and other similar words, are simply intended to guide the reader through the graphical illustrations of the processes and are not intended to limit the order in which the process steps depicted in the illustrations can be performed.

Additionally, one or more of the various process steps depicted in FIG. 7 and FIG. 8 can be performed by the one or more devices 106 of the distributed computing resources 102, the computing devices 120, or a combination thereof in order to provide expanded coverage of entities for queries involving tail concepts.

FIG. 7 is a flow diagram that illustrates an example process 700 for concept expansion. Example functions shown in FIG. 7 and other flow diagrams and example processes herein can be implemented on or otherwise embodied in one or more computing device(s) 106 or 120, e.g., a computing device 200 and/or 300, e.g., using software running on such device(s). For the sake of illustration, the example process 700 is described below with reference to processing unit 202 and other components of computing device 200, FIG. 2 that can carry out or participate in the steps of the example method. However, other processing unit(s) such as processing unit 108, 122, 302 and/or other components of computing device(s) 106 or 120 can carry out step(s) of described example processes such as process 700. Similarly, example method(s) shown in FIG. 8 are also not limited to being carried out by any specifically-identified components.

In some examples, at block 702, a query can be received from one or more devices. The query can include a concept name and at least one seed entity. Some examples are described above with reference to the receiver module 218.

At block 704, concept expansion can be performed. Some examples are described above with reference to the expansion module 220.

At block 706, at least some of the results of the concept expansion can be exposed. Some examples are described above with reference to the output module 226.

FIG. 8 is a flow diagram that illustrates an example process 800 for concept expansion employing a bipartite graph.

In some examples, at block 802, a query can be received from one or more devices. The query can include a concept name and at least one seed entity. Some examples are described above with reference to the receiver module 218.

At block 804, a graph can be generated between entities including the at least one seed entity and data associated with tables. Some examples are described above with reference to the graphing module 224.

At block 806, concept expansion can be performed by processing the query based at least in part on the graph. Some examples are described above with reference to the expansion module 220.

In some examples, at block 808, e.g., after block 704 or block 706, at least some of the results of the concept expansion can be exposed. Some examples are described above with reference to the output module 226.

Illustrative Experimental Results

FIGS. 9 through 13 illustrate results from experimental evaluation of concept expansion using tables as described herein. The figures compare the ranking quality of different approaches in terms of precision and recall, and illustrate sensitivity of the concept expansion as described herein to different example parameter settings.

The examples illustrated used a production search engine, particularly WTS, which indexed over 500M web tables extracted from a recent snapshot of the Microsoft BING search engine. This is the same WTS that powers web table search in EXCEL POWERQUERY. The examples illustrated used concepts in PROBASE as the testbed for expansion. The examples illustrated used PROBASE instead of knowledgebases like YAGO or FREEBASE for better concept coverage of tail concepts—of course, others may be used.

To prepare the set of concept queries, 9,926 concepts were acquired from PROBASE. In PROBASE, each concept-entity pair has a popularity value indicating the number of different domains it is found on the web. Concepts with popularity above 150 were chosen so that the concept is not too niche and the web-extracted concept-entity pairs would be relatively reliable. Seed entities were sampled based on their popularity. 1,000 tables were retrieved for each concept, ending up with a dataset of 10M web tables.

Number of occurrences (# Occur). In this baseline approach, the examples illustrated included ranking entities by their number of occurrences in the top ranked tables returned by the WTS. Entities that occurred more often in top tables were ranked higher.

Weighted number of occurrences (Weighted # Occur). This approach enhances the previous one by weighting each occurrence of entity using the table prior. In addition, in order to utilize seed information, the examples illustrated only consider tables with 2 or more seeds. Entities were ranked by their aggregate weight across these tables.

SEISA. Set expansion aims to automatically discover entities in the target concept using seed entities but not concept name as input. The examples illustrated implemented the Dynamic Thresholding algorithm in the SEISA system, which has shown a competitive technique for set expansion using web lists.

Graphical Model. The examples illustrated implemented a graphical model-based table ranking method. It took column keywords as input and outputs a ranked list of relevant tables. The examples illustrated used the table prior as a feature for node potential and the column value overlap as edge potential in this graphical model.

Generalized Co-HITS (PageRank). Personalized PageRank and its variations have been adopted in other set expansion systems like SEAL. For a bipartite graph in the examples illustrated herein, the most appropriate variation to use was a generalized Co-HITS algorithm referred to as PageRank. The examples illustrated set high restart probability on entity prior and low on table prior.

CONCEPTEXPAND. This represents application of the Algorithm of FIG. 6, using aggregation functions discussed in above. The threshold for table filtering was set to 0, without any tuning.

CONCEPTEXPAND_PageRank. To study the value of aggregation functions, The examples illustrated included a variation of CONCEPTEXPAND that used random walk aggregation functions as discussed above.

Ground truth preparation. PROBASE has an incomplete coverage of entities per concept, especially for tail concepts. For the examples illustrated, 100 fine grained concepts were randomly checked and it was found that more than 90% of time the first relevant entity found in the web tables does not exist in PROBASE. A study of YAGO's fine grained concepts found similar results. To obtain a reliable set of ground truth, the examples illustrated first identified 90 concepts for which PROBASE covers at least 4 entities in top-10 WTS tables.

Then samples for 54 unambiguous concepts were labeled. Finally, the labels and PROBASE entities were merged to form a ground truth set. The final ground truth for each concept may still have been incomplete, but it was largely augmented upon PROBASE entities. This set had 18,232 relevant entities in total, with an average number of 338 entities per concept. The number of PROBASE entities per concept ranged from 4 to 60, with a mean of 23.

The labeled concepts spanned across multiple domains, such as geography, economy, business, healthcare and technology. Sample concepts and output from the algorithm were listed in Tables 1 and 2, respectively.

Metrics. The examples illustrated used two metrics for evaluation: Mean average precision (MAP). This is the standard information retrieval measure for overall ranking performance. Relative recall $$\left( r = \frac{\# \text{ returned relevant entities}}{\# \text{ seed entities}} \right)$$

at a certain precision level is a metric more concerned with the practical value of the concept expansion task. It reflects the best recall one algorithm can achieve before falling below a precision level. Typically, the requirement for the precision in a knowledgebase is very high. Although the examples illustrated employing concept expansion techniques as described herein did not expect the expansion algorithm to return 100% correct results to directly populate into a knowledgebase, a high precision level such as 0.9 can be helpful for easing the job of human curators in noise filtering.

Figure 9:
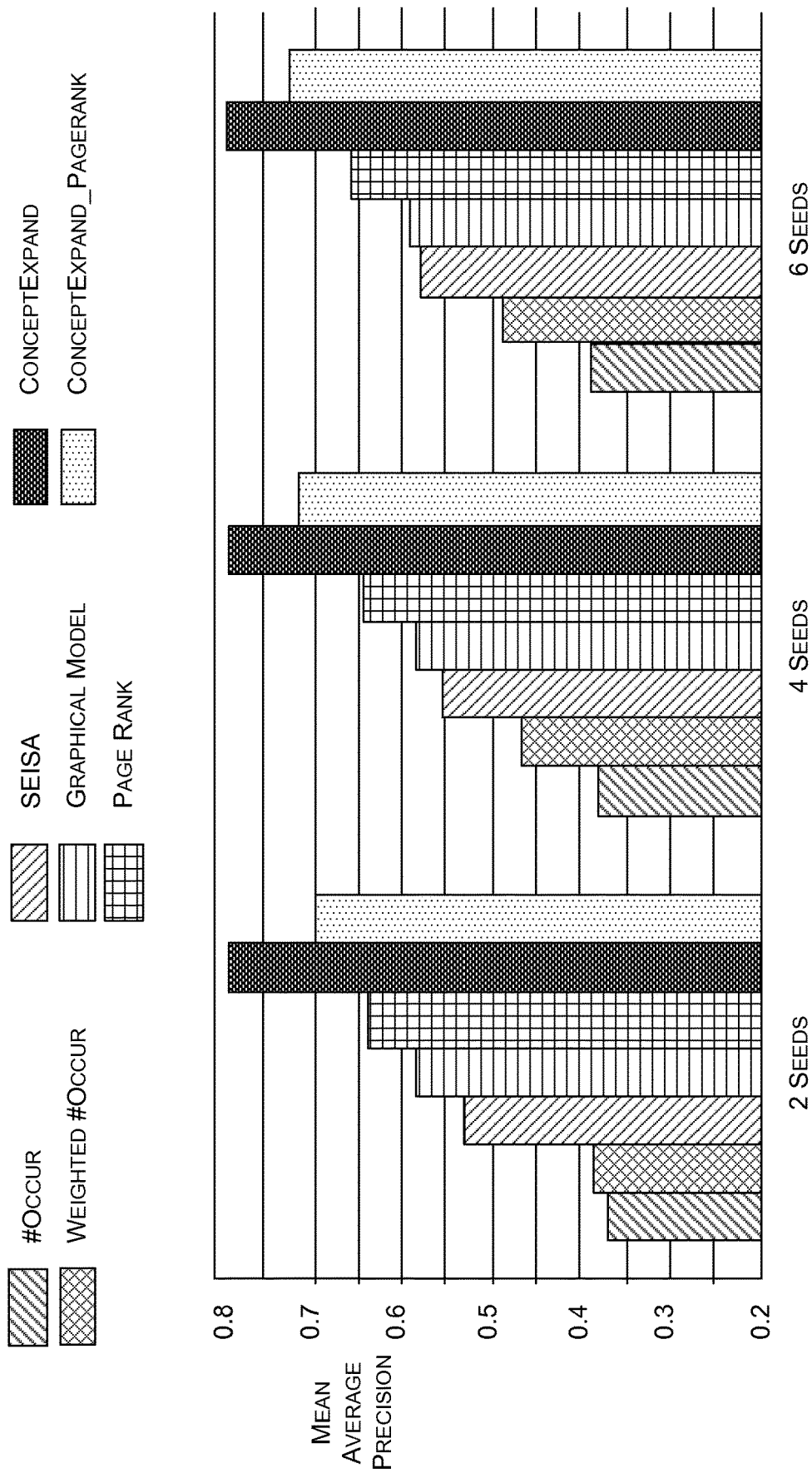
FIG. 9 illustrates example mean average precision for 2, 4, and 6 seed entities compared to a number of other methods.
Figure 10:
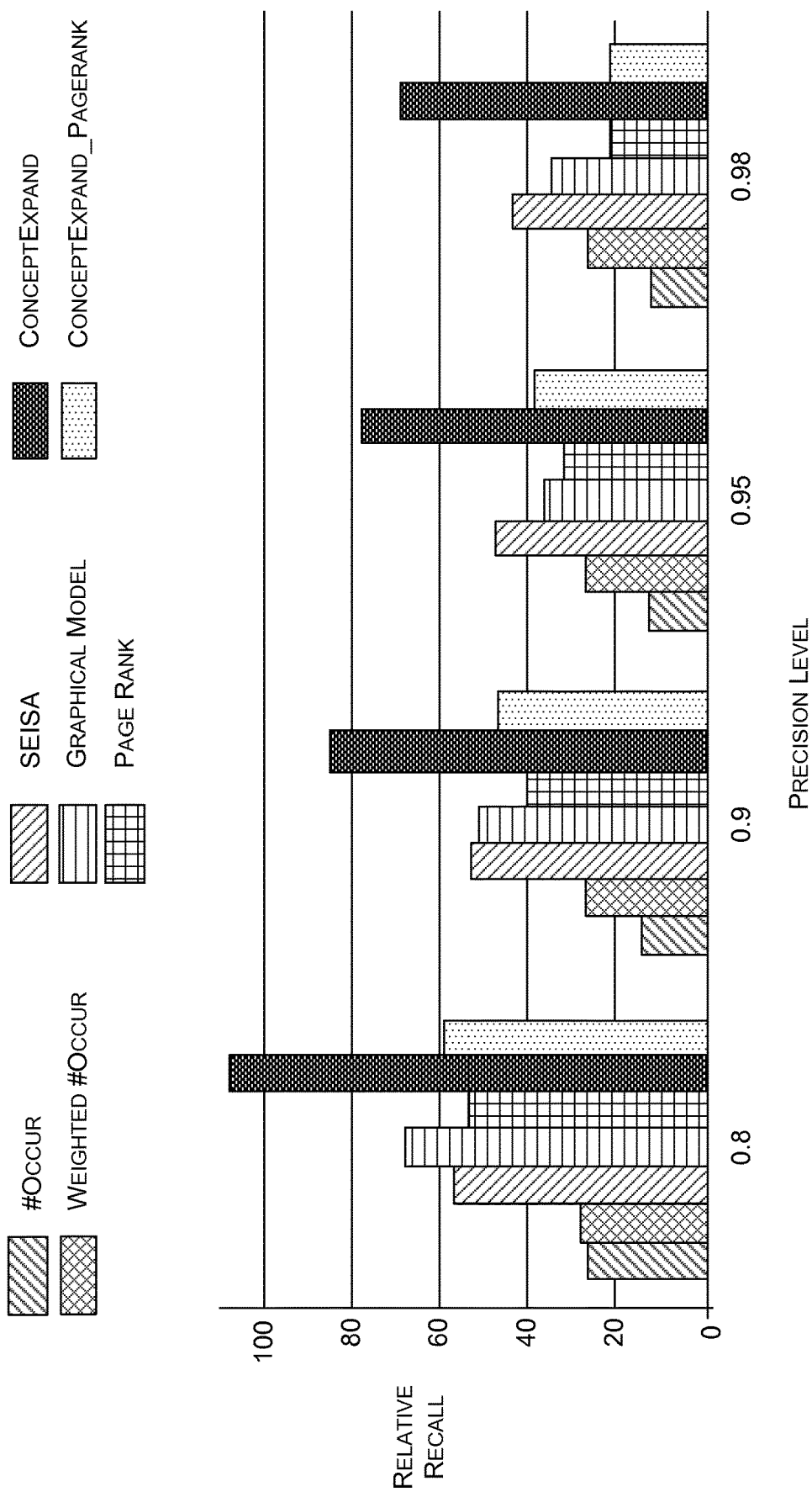
FIG. 10 illustrates example relative recall for 0.8, 0.9, 0.95, and 0.98 precision compared to a number of other methods.
Figure 11:
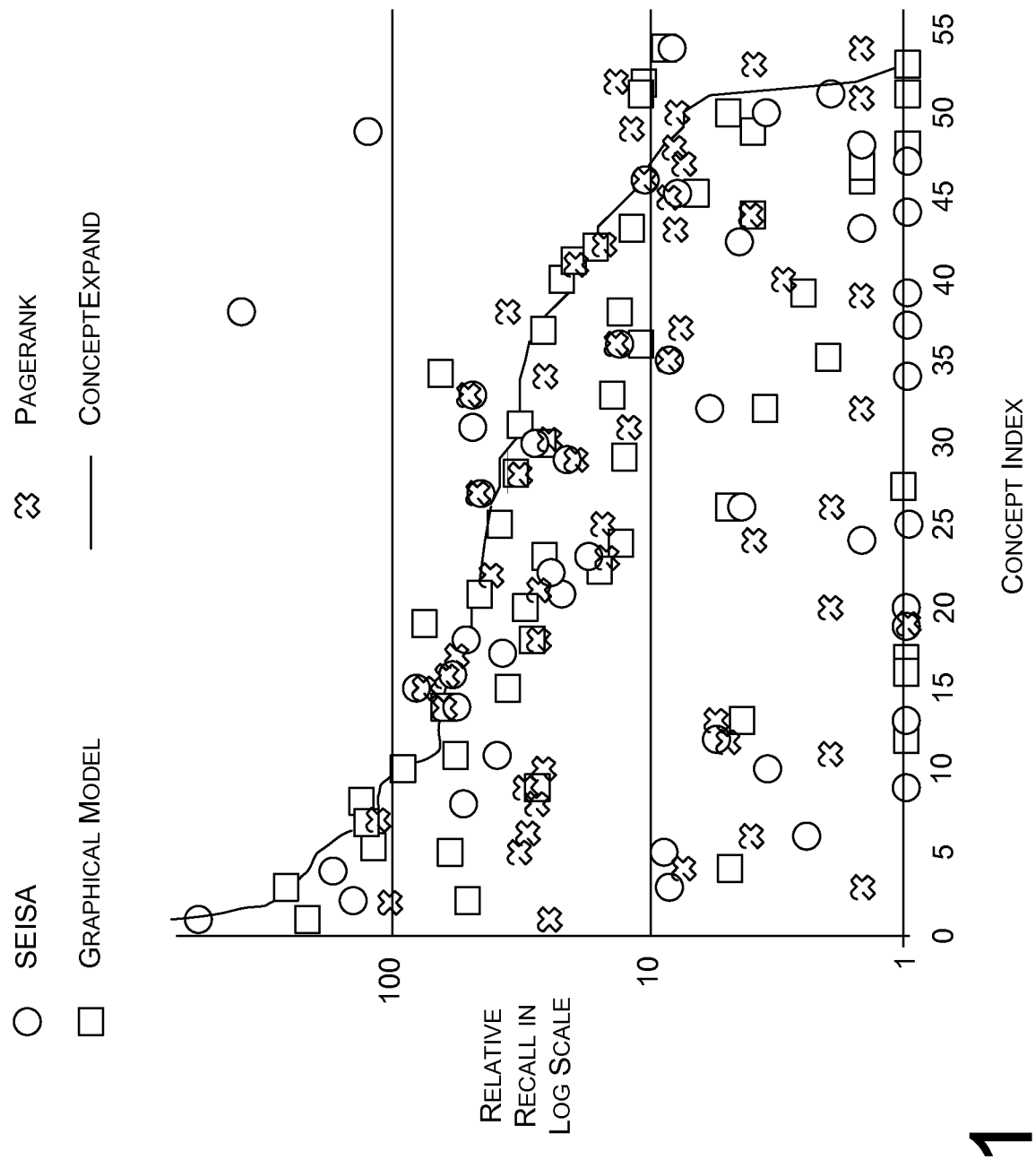
FIG. 11 is a scatter plot of example relative recall for 0.98 precision for concept expansion and some of the other methods from FIG. 9.

This section compares the 7 methods from the examples illustrated. FIGS. 9 through 11 plot the mean average precision and relative recall at different precision levels. In the figures, the methods are sorted according to the order they were introduced above.

MAP performance. The overall ranking performance measured by MAP is consistent when using different number of seeds (FIG. 9). The first six methods can be roughly partitioned into three groups according to their MAP: (i) baseline algorithms, # Occur and Weighted # Occur; (ii) existing methods adapted to this task, SEISA, Graphical Model and PageRank; and (iii) the concept expansion method described herein, CONCEPTEXPAND and CONCEPTEXPAND_PageRank. The gap is large across groups. As shown, CONCEPTEXPAND outperforms existing algorithms by 20-50%. Note that a filtering parameter for CONCEPTEXPAND was not tuned in this experiment.

As shown, results for the last method CONCEPTEXPAND_PageRank were about halfway between CONCEPTEXPAND and PageRank. This shows that both the inference algorithm and the aggregation functions contribute to the superior performance of CONCEPTEXPAND.

As shown, CONCEPTEXPAND is not sensitive to the number of seeds. Without parameter tuning, CONCEPTEXPAND achieved a mean average precision of close to 80% with two seeds per concept.

High precision performance. FIGS. 10 and 11 illustrate that there was an even larger gap between CONCEPTEXPAND and the other algorithms for relative recall at high precision levels. Though each of the illustrated methods demonstrated some increase of the entity coverage before the precision falls below a tolerable threshold, the degree of increase differs across the methods. For example, at precision level 0.98, PageRank increased the coverage by 20 times and SEISA achieved 44 times expansion. However, neither were comparable to the 70 times gain of CONCEPTEXPAND.

FIG. 11 further visualizes the individual performance for the 54 concepts. With a few outliers, CONCEPTEXPAND dominated in the relative recall. When the requirement to precision gradually lowers down, CONCEPTEXPAND achieved even higher recall (108 times at precision level 0.8). Again, without parameter tuning, CONCEPTEXPAND showed strong superiority in its practical value.

Connecting the overall ranking performance (FIG. 9) to the performance at high precision (FIGS. 10 and 11), provided two interesting observations. First, CONCEPTEXPAND_PageRank improved the overall performance of the PageRank algorithm by removing low confidence entities and tables, but the improvement is not much on the high precision end. FIG. 10 illustrates that the recall for CONCEPTEXPAND_PageRank was one third to one half of that for CONCEPTEXPAND. Therefore, the illustrated examples show the high recall at high precision of CONCEPTEXPAND was mainly attributed to its asymmetric, non-linear score propagation following the special entity-table relationship, rather than the filtering.

Second, there was no clear winner among the three existing algorithms SEISA, Graphical Model and PageRank. Though PageRank had a better MAP than the other two, it performed poorly at high precision levels (lower than baseline at p-level 0.98). In contrast, SEISA performed well at precision levels above 0.9, but underperformed Graphical Model at p-level 0.8, and eventually has a lowest MAP among the three. This observation reflects the limitations of existing algorithms.

Figure 12:
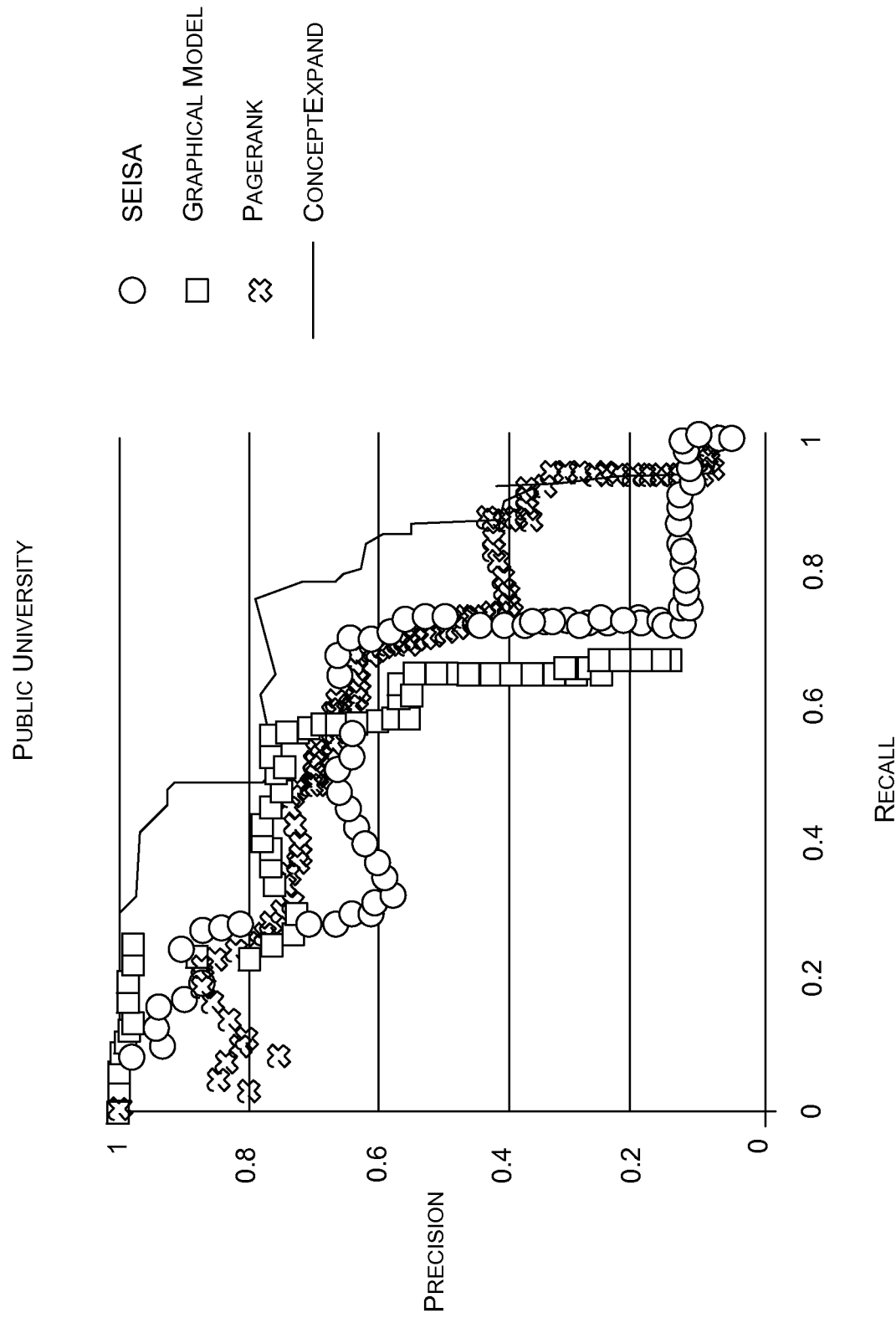
FIG. 12 illustrates an example precision-recall curve case study.

FIG. 12 illustrates this with a precision-recall curve using the concept 'public university' as an example. As shown, set expansion techniques like SEISA found most similar entities in the beginning, yet shifted to different concepts (e.g., from public university to other universities) without constraining the expansion. Concept-name-based table ranking like Graphical Model does not utilize seed entities, and suffered from imperfect table ranking. For example, several tables about public university cost, programs, salaries, faculty numbers were ranked among the top 20. PageRank took advantage of both concept names and seed information, but it tended to select popular entities from different tables and mix them because of the linear score aggregation. Popular irrelevant entities (e.g., New York University) were ranked high and inserted between relevant ones, thus PageRank did not produce contiguous high precision results.

FIG. 13 illustrates how the algorithm performed in response to varying parameter values using one parameter, the stopping criterion α. Recall that this parameter controls the precision-recall trade-off; it determines when the core table set stops expansion. The earlier described experiments used α=0, which means all tables were added to the table set. As α increased, fewer tables were added, which helped eliminate irrelevant tables. When α was equal or larger than 1, only one table was added, leading to poor results.

In the illustrated experiments, table prior scores were sorted in descending order and a was set to the score at certain positions of the ranked scores. For example, the experiment used the lower quartile (denoted as lower ¼), median (½), upper quartile (upper ¼) and so on. FIG. 13 shows the mean average precision and relative recall at different precision levels. As shown, CONCEPTEXPAND worked robustly in a wide range of α. The MAP has very small change when α varied from 0 to upper 1/16 quantile of table prior. The most sensitive metric was recall at precision level 0.8. It reached the peak around 110 at median and declined when α further increased, but it was still above 100 when α was equal to the upper quartile of table prior, where the other three curves reached a high point. In the worst case in the test (α=upper 1/16 quantile), the recall at precision 0.98 was still much higher than PageRank's recall at precision 0.8. These results indicate a stop criterion ranging from median to upper quartile of a table prior can be a good choice, depending on the goal of precision. For higher precision a slightly higher α was preferred. As long as α is not too large to leave enough tables, the illustrated examples show stable performance can be expected.

CONCLUSION

Various concept expansion techniques described herein can permit more robust query results for tail concepts.

Although the techniques have been described in language specific to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, or 200 such as one or more internal or external CPUs or GPUs, and/or one or more pieces of hardware logic such as FPGAs, DSPs, or other types described above.

All of the methods and processes described above can be embodied in, and fully automated via, software code modules executed by one or more computers or processors. The code modules can be stored in any type of computer-readable medium, memory, or other computer storage device. Some or all of the methods can be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc., can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternative implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A device comprising:
    a processing unit;
    a computer-readable medium including modules configured for execution by the processor, the modules comprising:
    a receiver module configured to receive a query including a query concept name and at least one seed entity;
    an expansion module configured to perform concept expansion by:
    searching a database for tables of entities based on the query concept name;
    ranking the tables based on at least one keyword of the query concept name that is found in at least one of column headers, captions, and surrounding text of the tables;
    ranking data entities of the tables based on the ranking of the tables and the at least one seed entity matching at least one of the data entities, the data entities including table cell values and data associated with the tables;
    identifying at least one of the tables, wherein each data entity in the at least one of the tables is relevant to the at least one seed entity, having no data entity that has a rank less than a predetermined parameter value, as an exclusive table;
    determining one or more data entities relevant to the query concept name from only the exclusive table;
    producing an expanded concept including the query concept name, the at least one seed entity, and the one or more data entities relevant to the query concept name;
    building an expanded query based on the expanded concept; and
    an output module configured to expose results for the expanded concept as an expanded query.

2. The device as claim 1 recites, wherein the tables comprise web tables, the cell values include text entities and the data associated with the tables includes at least one of a header, a column name, a row name and an annotation.

3. The device as claim 1 recites, further comprising a graphing module configured to generate a graph between entities including the at least one seed entity and the data associated with tables.

4. The device as claim 3 recites, wherein the expansion module is configured to process the query based at least in part on the graph.

5. The device as claim 3 recites, wherein the graph comprises a bipartite graph.

6. The device as claim 1 recites, the modules further comprising a ranking module configured to rank the results based at least in part on the exclusive table.

7. The device as claim 1 recites, the modules further comprising a ranking module configured to rank the results based at least in part on all entities of the exclusive table being relevant to the query.

8. A method comprising:
receiving a query including a query concept name and at least one seed entity;
performing concept expansion including:
searching a database for tables of entities based on the query concept name, ranking the tables based on at least one keyword of the query concept name that is found in at least one of column headers, captions, and surrounding text of the tables;
ranking data entities of the tables based on the ranking of the tables and the at least one seed entity matching at least one of the data entities, the data entities including table cell values and data associated with the tables;
identifying at least one of the tables, wherein each data entity in the at least one of the tables is relevant to the at least one seed entity, having no data entity that has a rank less than a predetermined parameter value, as an exclusive table;
determining one or more data entities relevant to the query concept name from only the exclusive table;
generating an expanded concept including the query concept name, the at least one seed entity, and the one or more data entities relevant to the query concept name; and
generating an expanded query from the expanded concept.

9. The method as claim 8 recites, wherein the tables comprise web tables and the data associated with the web tables includes at least one of a header, a column name, a row name, and an annotation.

10. The method as claim 8 recites, further comprising processing the query based at least in part on a graph between entities including the at least one seed entity and tables.

11. The method as claim 10 recites, wherein the graph comprises a bipartite graph.

12. The method as claim 8 recites, further comprising ranking the entities in the expanded concept based at least in part on the exclusive table.

13. The method as claim 8 recites, further comprising ranking the entities in the expanded concept based at least in part on all entities of the exclusive table being relevant to the query.

14. A computer-readable memory having stored therein computer executable instructions, arranged to, upon execution, configure a computer to perform operations comprising:
receiving a query including a query concept name and at least one seed entity;
identifying a plurality of tables, each table including the query concept name or the at least one seed entity as data entities;
ranking the tables based on at least one keyword of the query concept name that is found in at least one of column headers, captions, and surrounding text of the tables;
ranking data entities of the tables based on the ranking of the tables and the at least one seed entity matching at least one of the data entities, the data entities including table cell values and data associated with the tables;
identifying at least one of the tables, wherein each data entity in the at least one of the tables is relevant to the at least one seed entity, having no data entity that has a rank less than a predetermined parameter value, as an exclusive table;
determining one or more data entities relevant to the query concept name from only the exclusive table;
generating a graph between entities including the at least one seed entity and the data entities of the tables;
performing concept expansion to generate an expanded concept by processing the query based at least in part on the graph and the exclusive table, wherein the expanded concept includes the query concept name, and the one or more data entities relevant to the query concept name; and
generating an expanded query from the expanded concept.

15. The computer-readable memory as claim 14 recites, wherein the data associated with the tables comprises at least one of a header, a column name, and an annotation.

16. The computer-readable memory as claim 14 recites, wherein the graph comprises a bipartite graph.

17. The computer-readable memory as claim 14 recites, wherein the operations further comprise ranking the results based at least in part on the exclusive tables.

18. The computer-readable memory as claim 14 recites, wherein the operations further comprise ranking the results based at least in part on all of the entities of the exclusive tables being relevant to the query.

* * * * *